United States Patent
Somers et al.

(10) Patent No.: US 10,839,215 B2
(45) Date of Patent: Nov. 17, 2020

(54) ARTIFICIAL INTELLIGENCE FOR EMULATING HUMAN PLAYSTYLES

(71) Applicant: Electronic Arts Inc., Redwood City, CA (US)

(72) Inventors: Caedmon Somers, Delta (CA); Jason Rupert, Port Coquitlam (CA)

(73) Assignee: ELECTRONIC ARTS INC., Redwood City, CA (US)

( * ) Notice: Subject to any disclaimer, the term of this patent is extended or adjusted under 35 U.S.C. 154(b) by 229 days.

(21) Appl. No.: 15/985,347

(22) Filed: May 21, 2018

(65) Prior Publication Data

US 2019/0354759 A1  Nov. 21, 2019

(51) Int. Cl.
| | | |
|---|---|---|
| G06K 9/00 | (2006.01) | |
| G06T 7/70 | (2017.01) | |
| G06K 9/62 | (2006.01) | |
| G06N 5/04 | (2006.01) | |

(52) U.S. Cl.
CPC ....... G06K 9/00671 (2013.01); G06K 9/6256 (2013.01); G06N 5/046 (2013.01); G06T 7/70 (2017.01)

(58) Field of Classification Search
CPC .. G06K 9/00671; G06K 9/6256; G06N 5/046; G06T 7/70; A63F 13/67; A63F 13/497
See application file for complete search history.

(56) References Cited

U.S. PATENT DOCUMENTS

| | | |
|---|---|---|
| 5,274,801 A | 12/1993 | Gordon |
| 5,683,082 A | 11/1997 | Takemoto et al. |
| 6,253,193 B1 | 6/2001 | Ginter et al. |
| 7,390,254 B2 * | 6/2008 | Hirai ................ A63F 13/10 463/4 |
| 8,100,770 B2 | 1/2012 | Yamazaki et al. |
| 8,142,282 B2 | 3/2012 | Canessa et al. |
| 8,267,764 B1 | 9/2012 | Aoki et al. |

(Continued)

FOREIGN PATENT DOCUMENTS

| | | |
|---|---|---|
| CN | 104657412 | 5/2015 |

OTHER PUBLICATIONS

Virginia Aponte, et al., "Measuring the level of difficulty in single player video games" (2011) Elsevier, Entertainment Computing.

(Continued)

*Primary Examiner* — Yon J Couso

(74) *Attorney, Agent, or Firm* — Knobbe, Martens, Olson & Bear, LLP

(57) ABSTRACT

An artificially intelligent entity can emulate human behavior in video games. An AI model can be made by receiving gameplay logs of a video gameplay session, generating, based on the gameplay data, first situational data indicating first states of the video game, generating first control inputs provided by a human, the first control inputs corresponding to the first states of the video game, training a first machine learning system using the first situational data and corresponding first control inputs, and generating, using the first machine learning system, a first artificial intelligence model. The machine learning system can include a convolutional neural network. Inputs to the machine learning system can include a retina image and/or a matrix image.

19 Claims, 12 Drawing Sheets

(56) References Cited

U.S. PATENT DOCUMENTS

| | | | |
|---|---|---|---|
| 8,398,476 | B1 | 3/2013 | Sidhu et al. |
| 8,540,560 | B2 | 9/2013 | Crowley et al. |
| 8,907,193 | B2 | 12/2014 | Cross et al. |
| 8,914,251 | B2 | 12/2014 | Ohta |
| 9,069,441 | B2 * | 6/2015 | Jacob ............... A63F 13/10 |
| 9,616,329 | B2 | 4/2017 | Szufnara et al. |
| 9,919,217 | B2 | 3/2018 | Aghdaie et al. |
| 10,105,603 | B2 | 10/2018 | Bucher |
| 10,286,323 | B2 | 5/2019 | Aghdaie et al. |
| 10,357,718 | B2 | 7/2019 | Aghdaie et al. |
| 10,478,730 | B1 | 11/2019 | Burnett |
| 2004/0067788 | A1 | 4/2004 | Angelopoulos |
| 2004/0152512 | A1 | 8/2004 | Collodi et al. |
| 2005/0130725 | A1 | 6/2005 | Creamer et al. |
| 2007/0066403 | A1 | 3/2007 | Conkwright |
| 2008/0268961 | A1 | 10/2008 | Brook |
| 2011/0295649 | A1 | 12/2011 | Fine et al. |
| 2012/0083330 | A1 | 4/2012 | Ocko |
| 2012/0115580 | A1 | 5/2012 | Hornik et al. |
| 2012/0220376 | A1 | 8/2012 | Takayama et al. |
| 2012/0233105 | A1 | 9/2012 | Cavallaro et al. |
| 2012/0244941 | A1 | 9/2012 | Ostergren et al. |
| 2012/0276964 | A1 | 11/2012 | Jones et al. |
| 2013/0316779 | A1 | 11/2013 | Vogel |
| 2013/0316795 | A1 | 11/2013 | Vogel |
| 2014/0235346 | A1 | 8/2014 | Kim et al. |
| 2015/0339532 | A1 | 11/2015 | Sharma et al. |
| 2016/0005270 | A1 | 1/2016 | Marr et al. |
| 2016/0067612 | A1 | 3/2016 | Ntoulas et al. |
| 2017/0259177 | A1 | 9/2017 | Aghdaie et al. |
| 2018/0161673 | A1 | 6/2018 | Pasternack et al. |
| 2018/0161682 | A1 | 6/2018 | Myhill |
| 2018/0169526 | A1 | 6/2018 | Aghdaie et al. |
| 2018/0243656 | A1 | 8/2018 | Aghdaie et al. |
| 2019/0294881 | A1 | 9/2019 | Polak et al. |
| 2019/0354759 | A1 | 11/2019 | Somers et al. |
| 2019/0381407 | A1 | 12/2019 | Aghdaie et al. |
| 2019/0388789 | A1 | 12/2019 | Aghdaie et al. |
| 2020/0078685 | A1 | 3/2020 | Aghdaie et al. |

OTHER PUBLICATIONS

Jamey Pittman, "The Pac-Man Dossier", Gamasutra, downloaded on Jun. 1, 2018, available at «https://web.archive.org/web/20161107115846/https://www.gamasutra.com/view/feature/3938/the_pacman_dossier.php?print=1»>.

Chris Pruett, Defining the All-Important Difficulty Curve, The Journal of Education, Community, and Value, vol. 8, Issue 1, Jan.-Feb. 2008, http ://com mons.pacificu. edu/cg i/viewcontent.cg i?article= 1002&context=inter08.

Aristidou, A. et al., "Inverse Kinematics Techniques in Computer Graphics: A Survey", Computer Graphics Forum, vol. 00 (2017), No. 00 pp. 1-24.

Davis, James et al., "A Sketching Interface for Articulated Figure Animation", Eurographics/SIGGRAPH Symposium on Computer Animation (2003).

Isola, Phillip et al., "Image-toImage Translation with Conditional Adversarial Networks", Berkeley AI Researbh (BAIR) Labovratory, UC Berkeley, Nov. 26, 2018.

Mehta, Dushyant et al., "Vnect: Real-time 3D Human Pose Estimation with a Single RGB Camera", ACM Transactions on Graphics, vol. 36, No. 4, Article 44. Published Jul. 2017.

Shih, Liang-Yu et al., "Video-based Motion Capturing for Skelton-based 3D Models", National Taiwan University.

Shorten, Connor, "Image-to-Image Translation with Conditional Adversarial Networks", Pix2Pix, https://towardsdatascience.com/pix2pix.869c17900998?gi=e4c177e8a7c7, Jan. 29, 2019.

Van De Panne, Michiel, "Control for Simulated Human and Animal Motion", Department of Computer Science, University of Toronto, 1998.

Bengio, et al, Curriculum Learning, Proceedings of the 26th International Conference on Machine Learning, 2009, in 8 pages.

Biggs et al., "Creatures Great and SMAL: Recovering the Shape and Motion of Animals from Video", Dec. 6, 2018, Springer, Computer Vision—ACCV: Asian Conference on Computer Vision 2018, pp. 3-19.

Chen et al., "Visualization System for Animating Vertebrate Animal Models", 2012, IEEE, 2012 Conference on Technologies and Applications of Artificial Intelligence, pp. 244-249.

Chou et al., "Self Adversarial Training for Human Pose Estimation", Nov. 15, 2018, APSI PA, Proceedings, APSI PA Annual Summit and Conference 2018, pp. 17-30.

Donges, Niklas, Transfer Learning—Towards Data Science, Apr. 23, 2018, https://towardsdatascience.com/transfer-learning-946518f95666.

Du et al., "Hierarchical Recurrent Neural Network for Skeleton Based Action Recognition", Jun. 2015, IEEE, The IEEE Conference on Computer Vision and Pattern Recognition (CVPR) 2015, pp. 1110-1118.

Ho, et al, Generative Adversarial Imitation Learning, pp. 1-14, arXiv:1606.03476v1 [cs.LG]; Jun. 10, 2016.

Kanazawa et al., "Learning Category-Specific Mesh Reconstruction from Image Collections", 2018, The European Conference on Computer Vision (ECCV), pp. 371-386.

Zweng et al., "Unexpected Human Behavior Recognition in Image Sequences using Multiple Features", Aug. 26, 2010, IEEE, 2010 20th International Conference on Pattern Recognition, pp. 368-371.

* cited by examiner

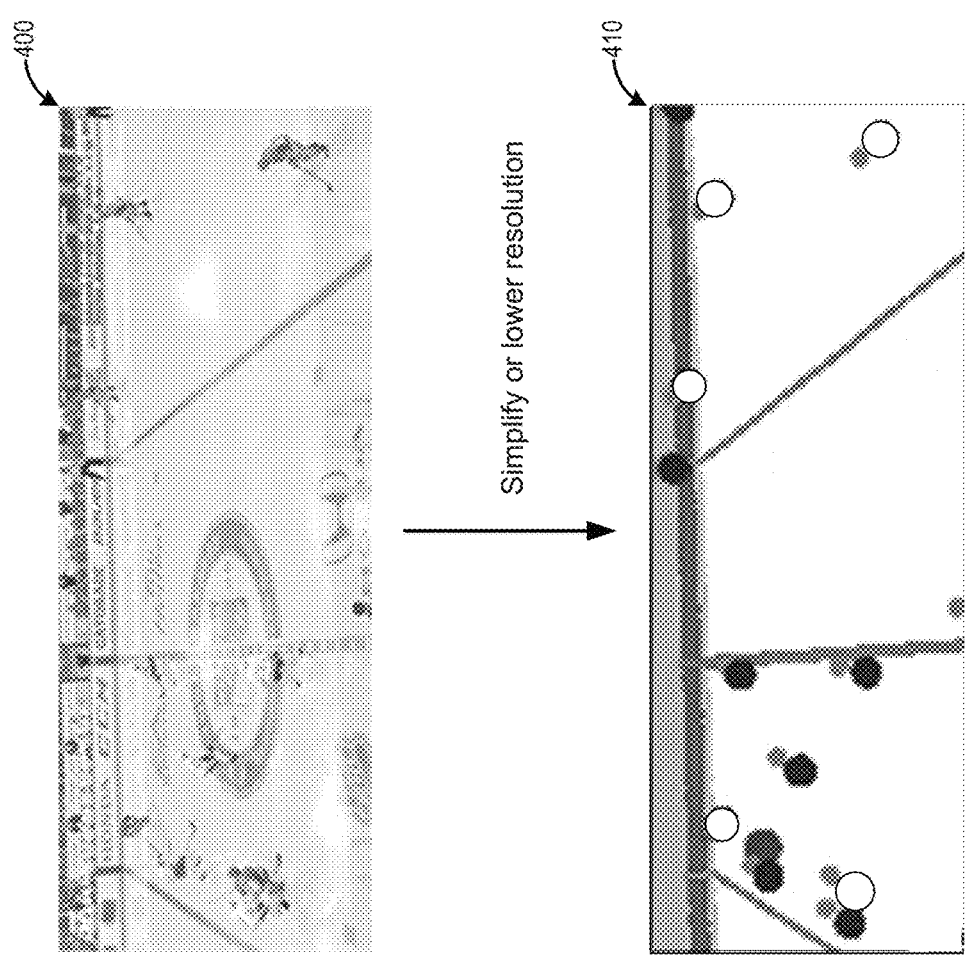

US 10,839,215 B2

ARTIFICIAL INTELLIGENCE FOR EMULATING HUMAN PLAYSTYLES

BACKGROUND

Field

This disclosure relates to artificial intelligence ("AI").

Description of the Related Art

Computer systems can natively perform mathematical operations, logical operations, read operations, and write operations. However, computers lack natural learning ability, creativity, and originality.

In many video games, "AI" controlled actors are implemented as a rigorous set of hard coded rules. To develop the "AI" program, programmers break down anticipated AI actor tasks and decisions into mathematical or logical comparisons, and then code those mathematical or logical comparisons in computer languages.

SUMMARY

The systems, methods, and devices in this disclosure each have several innovative aspects, no single one of which is solely responsible for all of the desirable attributes disclosed herein. Details of the one or more implementations of the subject matter described in this specification are set forth in the accompanying drawings and the description below.

Some aspects feature a non-transitory, computer-readable storage medium storing computer readable instructions that, when executed by one or more computing devices, causes the one or more computing devices to perform operations comprising: generating an image indicating positional information about objects in a virtual environment within a video game, the objects including at least one computer-controlled character; generating data including non-positional information about the objects in the virtual environment; providing the image and the data as inputs to an artificial intelligence (AI) model, executing the at least one command to control operation of the computer-controlled character within the virtual environment; and generating instructions to output the execution of the at least one command by the computer-controlled character within the virtual environment during runtime execution of the video game. The AI model is configured to: receive, as model inputs, the image and the data; process the model inputs; and generate, as outputs, at least one command to control operation of the computer-controlled character.

Some aspects features a computer-implemented method for controlling a computer-controlled character, the method comprising: generating an image indicating positional information about objects in a virtual environment of a video game, the objects including at least the computer-controlled character and a player controlled character; generating data including non-positional information about the objects in the virtual environment; providing the image and the data as inputs to an artificial intelligence (AI) model, and executing the at least one command to control operation of the computer-controlled character within the virtual environment. The AI model is configured to: receive, as model inputs, the image and the data; process the model inputs; and generate, as outputs, at least one command for controlling operation of the computer-controlled character.

Some aspects feature a system for controlling a non-player character (NPC), the system comprising: a player input device; a non-transitory computer-readable storage medium configured to store code for a video game; and one or more processors configured to execute the code to perform operations. The operations can include: generating an image indicating positional information about objects in a virtual environment of the video game, the objects including at least the computer-controlled character and a player controlled character; generating data including non-positional information about the objects in the virtual environment; providing the image and the data as inputs to an artificial intelligence (AI) model, wherein the AI model is configured to: receive, as model inputs, the image and the data, process the model inputs, and generate, as outputs, at least one command for controlling the computer-controlled character; executing the at least one command to control operation of the computer-controlled character within the virtual environment; and executing a command received through the player input device to control a player-controlled character within the virtual environment.

BRIEF DESCRIPTION OF THE DRAWINGS

FIG. 4A shows an example image frame and simplified version of the frame.

DETAILED DESCRIPTION

Overview

Figure 1:
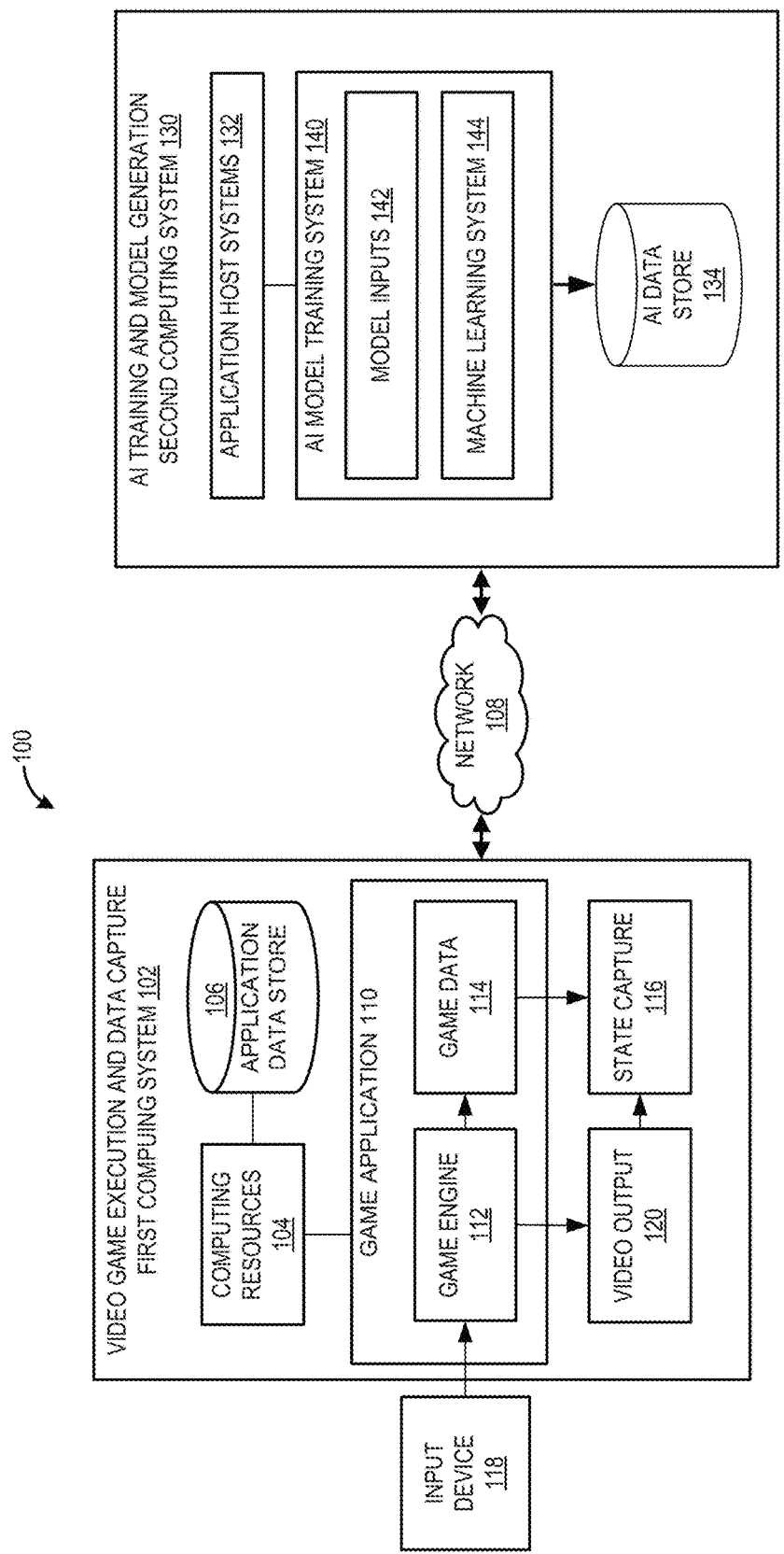
FIG. 1 shows a block diagram of a computing environment for generating AI models that emulates characteristics of human playstyles in video games.

Video games and other programs often include software-controlled virtual entities. In video games, these virtual entities may sometimes be referred to as computer players, bots, artificial intelligence ("AI") units, AI characters, or non-player characters ("NPCs"). These computer entities can be programmed to make certain decisions as though an intelligent person was controlling the AI unit. When the AI program is sophistically implemented, the video game can create the illusion that the computer entity is artificially intelligent. Nonetheless, there remains room for improvement in the design, programming, and execution of AI entities.

This disclosure includes systems and methods for generating models to control AI units based on replays of gameplay by people. The system can generate AI models that can be included in video games or other programs to control AI units as effectively as or more effectively than AI behaviors implemented as a hard coded algorithm. Furthermore, the methods disclosed herein can be reused to generate a variety of AI models to make a variety of decisions with less custom coding.

An AI model can be configured to control a unit or make decisions that emulate characteristics of human playstyles. The AI model can be incorporated into a program such as a video game to control the actions of NPCs to make the NPCs act as though controlled by human players.

AI can sometimes be written by programmers as rules in a software algorithm. For example, the software code for a hockey video game can include programmer-coded rules to determine if AI controlled character in possession of the puck should pass the puck. This can include determining the position of the puck carrier, determining a position of a teammate that is a pass recipient, calculating a path between the puck carrier and the pass recipient, calculating whether an opponent can reach the path to intercept the puck, and evaluating whether or not the pass recipient is in a better position to score (closer to the goal, at a more open angle to the goalie, and the like). To implement the decision making, a programmer translates each of these specific considerations into an algorithm of mathematical and logical statements executable by a computer in a way that, when executed, attempts to emulates the actions of a creative, intelligent person deciding whether or not to pass a puck in a game of hockey.

For the programmer, this can be a time consuming and imperfect process. To write an algorithm for a sophisticated AI character in a video game, the programmer can write mathematical and logical rules for every decision behind every action. The programmer can break down the game into smaller components or tasks, create mathematical or logical rules to determine how the NPC should react in response to a variety of inputs, implement the rules with particular numbers, test the NPC performance, and tune many numbers and variables that may have unappreciated effects. For a hockey video game, the tasks can include which direction to skate, when to pass, when to shoot, when to steal, when to deke, and how to do each of these actions when on offense, on defense, when carrying the puck, when the puck is loose, when teammates and opponents are in various positions, and the like. Then, to program an AI for basketball, the programmer can reconsider every factor in the context of basketball rules and repeat the process of writing an AI algorithm.

AI algorithms written by programmers can sometimes behave unnaturally or have glitches. Furthermore, the skill of the AI character and the decision making ability of the AI is affected by the programmer's knowledge and skill in a game, as well as the programmer's ability to understand the science and mechanics of a game, the ability to translate intuitive human decisions into a series of computer executable multivariable mathematical and logical operations, and the ability to tune and retune the multiple variables without causing unintended behaviors. Furthermore, regardless of how detailed a hardcoded AI algorithm is written, the hardcoded AI algorithm will remain a static set of rules that imperfectly emulate human creativity, instinct, and gut reactions, if at all.

There can be a number of advantages to generating and incorporating AI models generated and implemented as disclosed herein. Once configured, one AI model generating system can be used to generate AI models for a variety of games (such as hockey, basketball, football, racing games, shooter games, strategy games, and the like) with new gameplay data but with minor or no adjustments to the machine learning system. The AI models can be generated without a programmer specifically programming every action and every consideration behind each action. The AI models can be used to replicate aspects of behavior or gameplay that are not easily translated into mathematical equations or logical code, and the AI models can emulate behaviors that are not understood or considered by a programmer such that the programmers can be alleviated from understanding specific details of a sport or game. The AI models can more closely emulate natural human behaviors and exhibit fewer glitches. The AI models can be trained with different styles or different skill levels without coding the factors affecting such behavior. A machine learning system can also continue to learn, train, and improve AI models as new training data is collected, including data of humans playing against the AI models such that continual feedback can be used to improve the AI models. The AI models can creatively react at any time, instead of executing scripts or pre-recorded sequences, and the AI models can generalize decisions instead of making hard mathematical decisions or nearest neighbor matching. The AI models can be used to implement computer controlled NPCs that behave smarter and act more human-like. The AI models can be generated based on gameplay logs including gameplay from people who play with different styles, such as aggressive or conservative playstyles. Machine learning systems can generate AI models to behave according to different styles, a feature that can otherwise be difficult to implement as hard coded software rules.

Machine learning systems and AI have developed over the years, but such systems are imperfect and limited. For example, some machine learning systems can be slow to train or may need to be trained using impractically large amounts of training samples before generating useful AI models. Also, computer systems are limited in terms of processing speed and power, and computer systems can lack the ability to execute overly complex AI models in real time. For example, utility may be limited if a powerful server can generate and run AI models, but less powerful computing systems such as smartphones, personal computers, and consoles cannot run the AI model for a video game in real time.

A number of techniques are disclosed herein to make such systems useable or faster for both generating and executing AI models, and the techniques can allow even less powerful computing systems to run the AI models in real time. Certain pre-processing techniques can be applied to the inputs to a machine learning system to simplify the data for the machine learning system to recognize using certain techniques. For example, certain data can be formatted as an image format and provided to certain types of machine learning system such as neural networks to apply convolutional analysis. Parameters of the machine learning system can be optimized in certain ways so as to generate more effective models. Similar pre-processing techniques can be used in video games executing the AI models, and the AI models can be executed by computer systems in real time.

Some examples are discussed with respect to implementing an AI for a hockey video game. However, the technology disclosed herein can extend to any AI in any sport such as basketball, football, and the like. The technology can also be used in any video game including non-sport video games such as first person shooters, role playing games, real time strategy games, and the like. The technology can also be used to train AI to emulate human behavior in any program, even outside of video games, in any context where computer imitations of human behavior are used, such as simulators, visual rendering machines, interactive worlds, and the like.

For purposes of providing an overview, certain advantages have been described herein. It is to be understood that not necessarily all such advantages may be achieved in accordance with any particular embodiment. Thus, the various embodiments can be carried out in various manners that achieve or optimizes one advantage or group of advantages as taught herein without necessarily achieving other advantages as may be taught or suggested herein.

Overview of Video Game AI Training Environment

FIG. 1 shows a block diagram of a computing environment 100 for generating AI models that emulate characteristics of human playstyles in video games. The computing environment 100 includes a first computing system 102, a network 108, and a second computing system 130, which includes application host system 132, and a data store 134. To simplify discussion and not to limit the present disclosure, FIG. 1 illustrates a first computing system 102 and a second computing system 130, where the first computing system 102 can be used for video game execution and gameplay data capture, and where the second computing system 130 can be used for AI training and AI model generation. In various embodiments, multiple computing systems may be used in place of either the first computing system 102 or second computing system 130, and in some embodiments, the functionality of the first computing system 102 can be combined with the functionality of the second computing system 130 in a single computing system. The first computing system 102 may communicate via a network 108 with the second computing system 130. Although only one network 108 is illustrated, multiple distinct and/or distributed networks 108 may exist.

First Computing System

The computing system 102 includes computing resources 104 and an application data store 106. The computing system 102 may include any type of computing system. For example, the computing system 102 may be any type of computing device, such as a desktop, laptop, video game platform/console, television set-top box, television (for example, Internet TVs), network-enabled kiosk, car-console device, computerized appliance, wearable device (for example, smart watches and glasses with computing functionality), wireless mobile devices (for example, smart phones, personal digital assistants, tablets, or the like), and so forth. A more detailed description of an embodiment of a computing system 102 is described below with respect to FIG. 8.

Game Application

The user computing system 102 can execute a game application 110 based on software code stored at least in part in the application data store 106. The code can be stored on a computer readable, non-transitory medium. The game application 110 may also be referred to as a videogame, a game, game code, and/or a game program. A game application 110 should be understood to include software code that a computing system 102 can use to provide a game for a user to play. A game application 110 may comprise software code that informs a computing system 102 of processor instructions to execute, but may also include data used in the playing of the game, such as data relating to constants, images, and other data structures. In the illustrated embodiment, the game application 110 includes a game engine 112 and game data 114.

In some embodiments, the first computing system 102 is capable of executing a game application 110, which may be stored and/or executed in a distributed environment. For example, the first computing system 102 may execute a portion of a game and a network-based computing system, may execute another portion of the game. For instance, the game may be a massively multiplayer online role-playing game (MMORPG) that includes a client portion executed by the first computing system 102 and a server portion executed by a second computing system 130.

Game Engine

The game engine 112 can be configured to execute aspects of the operation of the game application 110. Execution of aspects of gameplay within a game application can be based, at least in part, on the user input received from an input device 118 and the game data 114. The game data 114 can include game rules, prerecorded motion capture poses/paths, environmental settings, constraints, skeleton models, route information, game state information, and/or other game application information.

The game engine 112 can execute gameplay within the game according to the game rules. Examples of game rules can include rules for scoring, possible inputs, actions/events, movement in response to inputs, and the like. Other components can control what inputs are accepted and how the game progresses, and other aspects of gameplay. The game engine 112 can receive the inputs from the input device 118 and determine in-game events, such as actions, jumps, runs, throws, attacks, and other events appropriate for the game application 110. During runtime operation, the game engine 112 can read in game data 114 to determine the appropriate in-game events.

In some examples, after the game engine 112 determines character events, the character events can be conveyed to a movement engine that can determine the appropriate motions the characters should make in response to the events and passes those motions on to a physics engine. The physics engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which generates a new frame for display to the user as video output 120. Video output can be displayed on a screen of a monitor, TV, smartphone, or console. The video output can also be displayed through accessories coupled to the computing system, such as screens on controllers, or projected through a projector. The process can repeated for rendering each frame during execution of the game application, and may occur multiple times a second. Though the process has been described in the context of a character, the process can be applied to any process for processing events and rendering the output for display to a user during run-time of the game application.

Game Data

The game data 114 can include game rules, prerecorded motion capture poses/paths, environmental settings, environmental objects, constraints, skeleton models, tutorial information, route information, and/or other game application information. At least a portion of the game data 114 can be stored in the application data store 106. In some embodiments, a portion of the game data 114 may be received and/or stored remotely, such as in a remote data store (not shown) associated with the second computing system 130. In such embodiments, game data may be received during runtime of the game application.

State Capture

During runtime, a state capture application 116 can be used to generate video gameplay logs (which refers to log files of gameplay of a video game, where the log files may but do not necessarily include video data). The video gameplay logs can include game state information, inputs provided by people through the input device 118, and/or images indicating positional information. The video gameplay logs can indicate which human inputs, images indicating positional information, and/or game state information correspond to each other, such as through timestamps, through a data structure, or through the ordering of data in the video gameplay log.

The game state information can include game data 114 such as character states, environment states, scene object storage, route information, positional information about objects in the game, non-positional information about objects in the game, speeds, directions, game modes, and/or other information associated with a runtime state of the game application 110. For example, the state capture application 116 can identify the state of the game application 110 at a specific point in time, such as a character position, character orientation, character action, game level attributes, and other information contributing to a state of the game application. The game state information can include dynamic state information that continually changes, such as character movement positions, and static state information, such as the identification of a game level within the game. In some embodiments, at least a portion of the game state information can be updated on a periodic basis, such as multiple times per second. In some embodiments, the game state information can be updated on an event-based basis.

In some embodiments, the images in the video gameplay log can be received from the video output. For example, the video gameplay log can include a collection of image frames (such as frame 400 of FIG. 4A) for each state of the game. In some embodiments, the image information in the video gameplay log can be in other formats (such as simplified image 410 of FIG. 4A, images in FIG. 4B, a foveated polar image representation such as retina image 500 of FIG. 5A, or matrix image 510 of FIG. 5A, and the like) and/or based on other information extracted from sources other than the video output. In some embodiments, the image information in the video gameplay log can be generated based on the video output 120 such as by simplifying or lowering the resolution of the video output. In some embodiments, the image information can be generated such as by generating a matrix image based on positions of in-game objects indicated by game data 114.

In some embodiments, the video gameplay log can include the inputs of the input device 118 and sufficient game data (such as random number seeds) such that a state of the video game and the progression of the video game could be replicated by a game engine, with or without any images.

As a person plays a video game, the state capture application can capture the control inputs that the person provided at each state of the game, along with a corresponding image, in a video gameplay log. The video gameplay logs can be provided through the network 108 to the second computing system 130 to train AI to control video game units to behave similarly to a unit controlled by a person.

Second Computing System

The second computing system 130 can include one or more application host systems 132 and an AI data store 134. The second computing system 130 may include one or more computing systems configured to execute a portion of the game application 110. In some embodiments, the one or more application host systems 132 can include one or more computing devices, such as servers and databases that may host and/or execute a portion of one or more instances of the game application 110.

Application Host System

In some embodiments, the application host system 132 may execute a hosting system for executing various aspects of a game environment. For example, in some embodiments, people can provide inputs through the input device 118 are processed by the game application and communicated to the application host system 132, which simulates actions of a video game character controlled by the inputs as well as actions of other characters in the video game, and then transmits data about interactions and the video game environment back to the game application 110.

In some embodiments, if a gameplay log is received that does not include images but otherwise includes the user inputs and sufficient data to replicate a state of the video game and the progression of the video game, then the application host system 132 can replicate the states of the game and the progression of the game to generate an image for each state of the replicated game.

In some embodiments, the game application 110 may be a single player game in which the application host system 132 may provide additional functionality when communicating with the instance of the game application 110. In some embodiments, the application host system 132 can provide a dedicated hosting service for hosting multiplayer game instances or facilitate the creation of game instances hosted by user computing devices. In some embodiments, the host application system 132 can provide a lobby or other environment for users to virtually interact with one another.

AI Model Training System

Figure 4B:
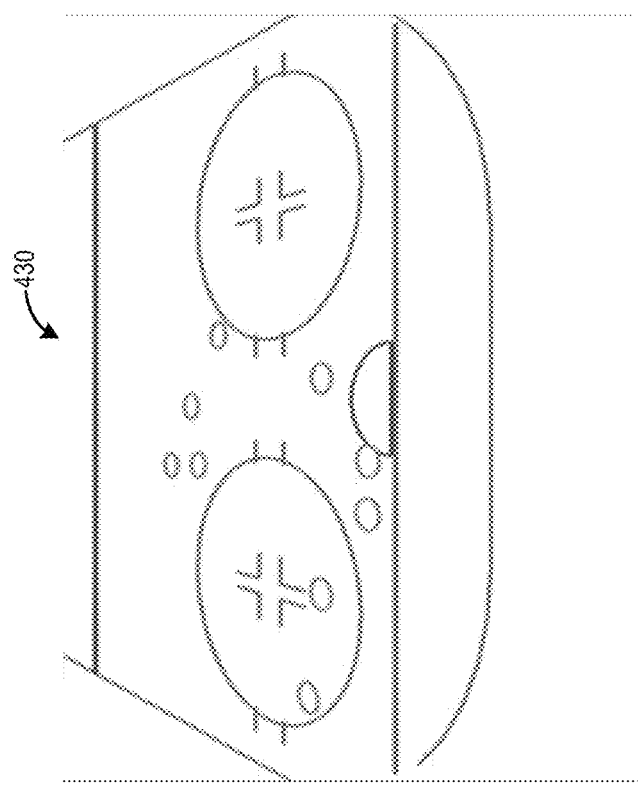
FIG. 4B shows additional examples of simplified image formats.
Figure 4B:
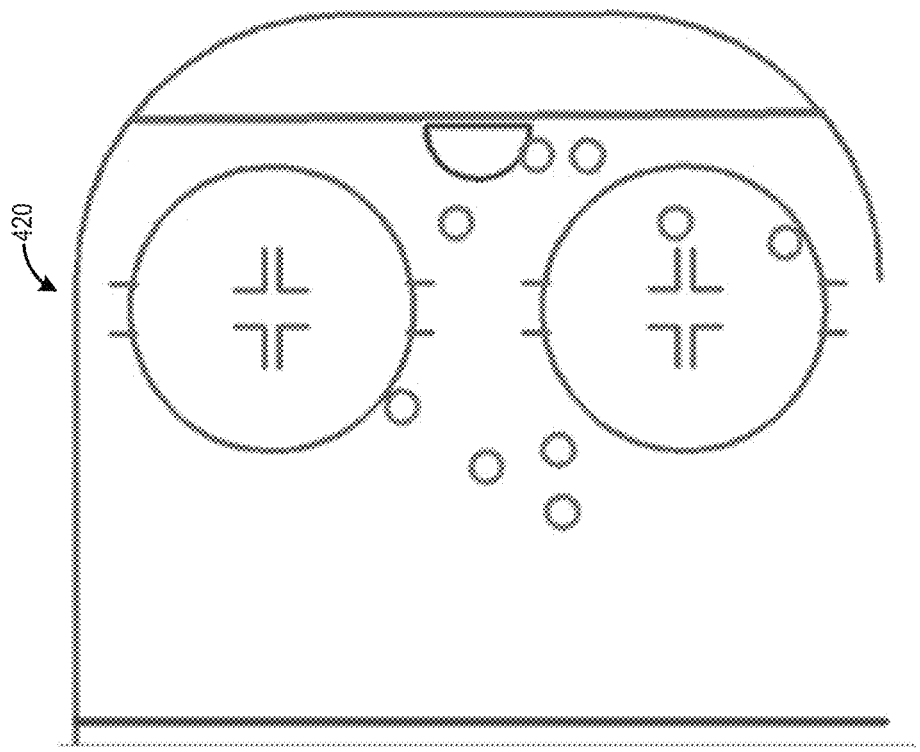
Figure 5A:
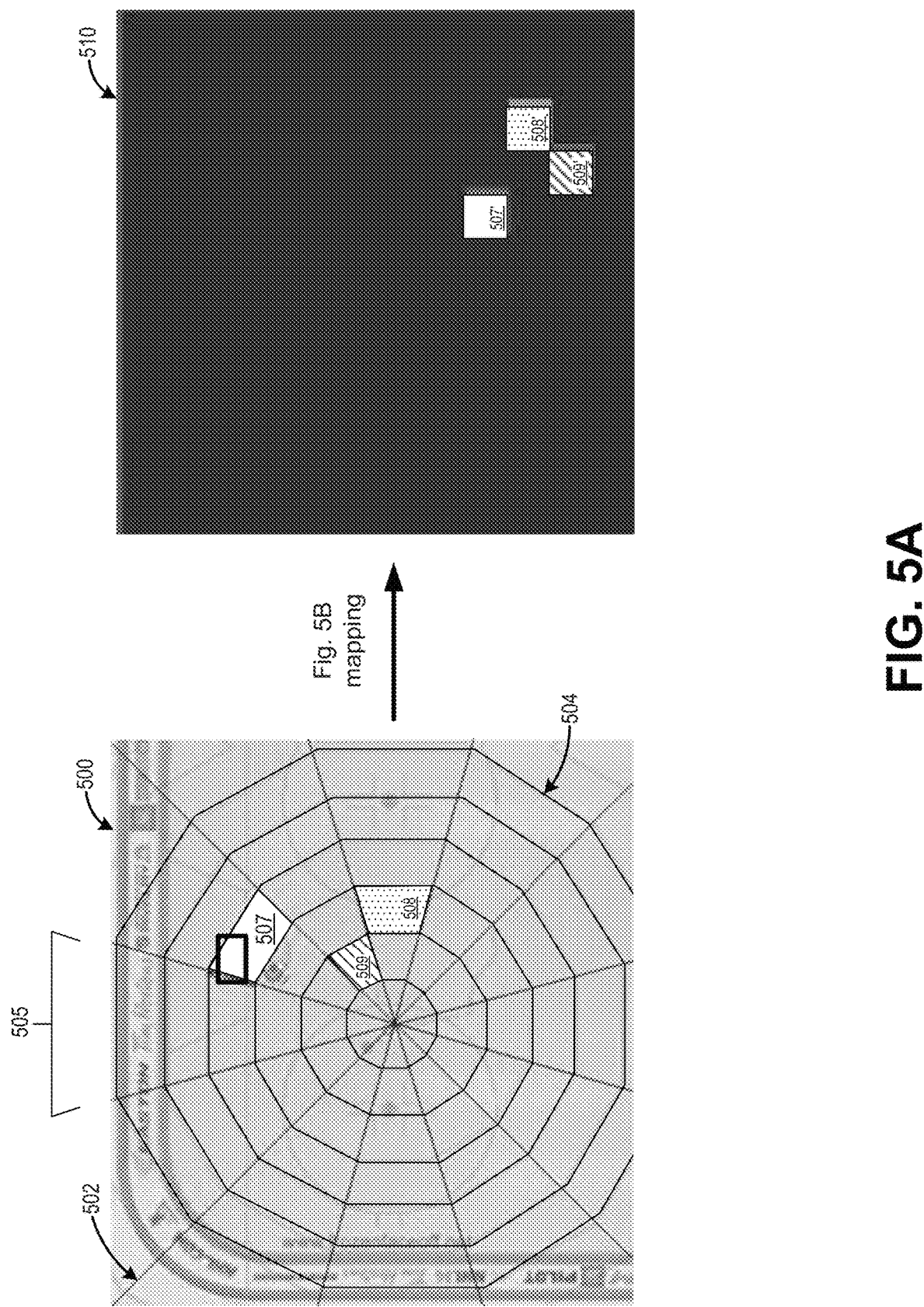
FIG. 5A shows an image in a retina format and in a matrix image format.

The AI Model training system 140 can be used to train AI models based on the logs of video gameplay. As further shown in FIG. 2A, model inputs 142 are provided to a machine learning system 144. The model inputs 142 can include, for example, game state information, user controls associated with each state of the game, and an image indicating positional information of objects in a virtual environment. The image can be a frame from the video output, a lower resolution or simplified version of the frame from the video output (such as shown in FIG. 4A), or an image indicating positional information generated based on the game state information (such as shown in FIG. 4B and FIG. 5A) from sources other than the video output. In some embodiments, the image can be in a matrix image format (such as shown in FIG. 5A and further explained with respect to FIG. 5B).

In some embodiments, AI models can be generated using machine learning system 144. The machine learning system can be configured to generate a model to emulate the playstyles of human players in various video game scenarios. Generation and application of the AI models will be described in further detail below. Machine learning systems can be implemented using libraries such as Theano or Keras in Python or other languages.

In some embodiments, the machine learning system can include a convolutional neural network configured to use convolution analysis to analyze the images. The images can be analyzed along with the game state information and the user inputs so that the machine learning system can generate a model that can generate user inputs under a variety of gameplay situations such that the user inputs emulate a playstyle of a human player.

Some other examples of machine learning systems that can be used to generate and update the AI models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

AI Data Store

The AI models generated by the AI model training system 140 can be stored in a data store 134. The data store 134 can store a plurality of AI models to be executed under different circumstances. There can also be a strategy AI model to select one of the other AI models to execute based on a current game state. The models in the data store 134 can be incorporated into a video game, such as game application 110 or application host system 132, to control the behavior of NPCs. For any state of the game, a selected AI model can be executed to determine controls that emulate what a human player might do in that state, and the game application 110 or application host system 132 can cause the NPC to behave according to the determined controls.

Network

The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

Example Model Generation

Figure 2A:
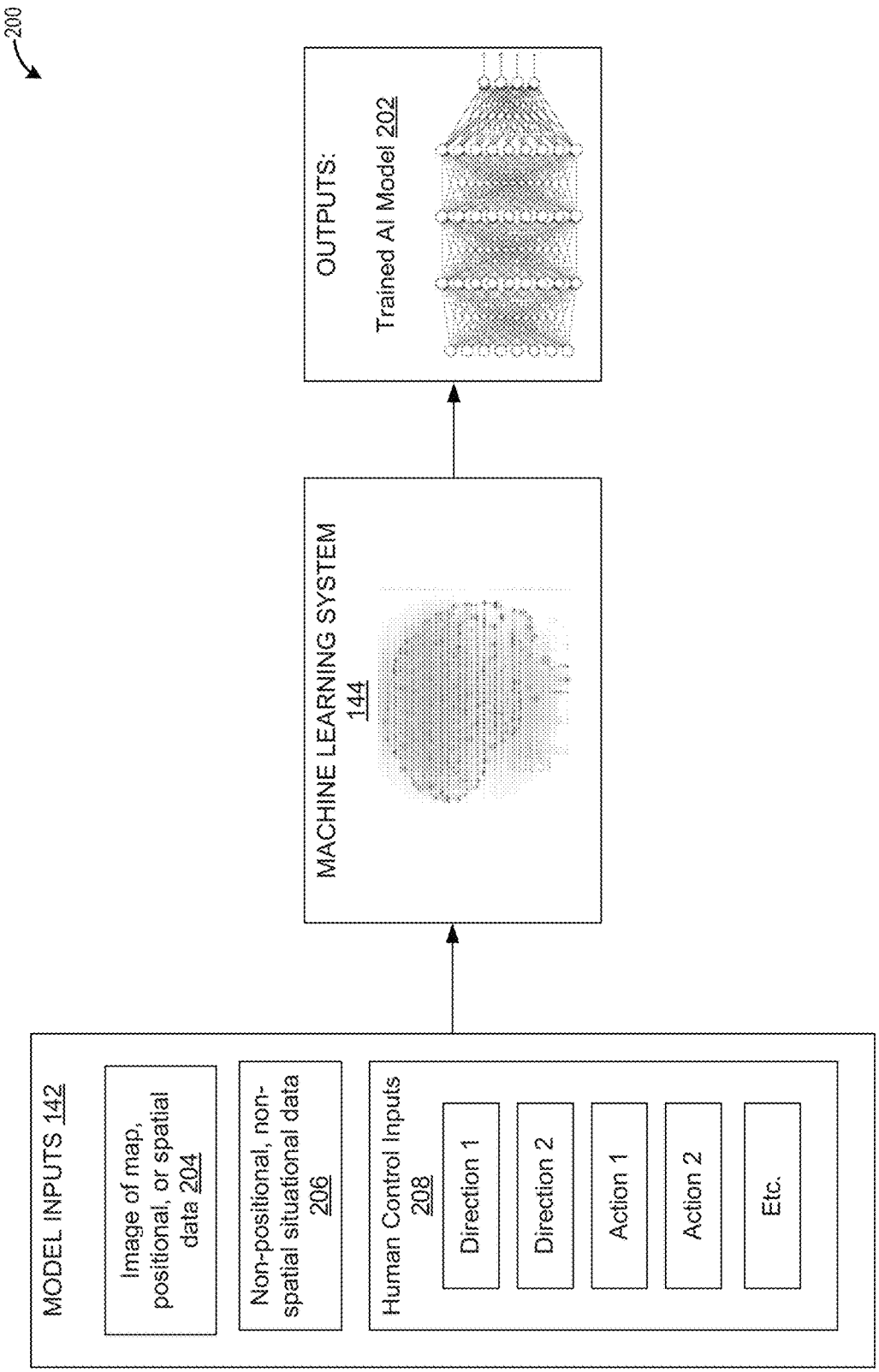
FIG. 2A shows an example block diagram for generating a trained AI model.

FIG. 2A shows an example block diagram 200 for generating a trained AI model 202. A plurality of model inputs 142 are provided to a machine learning system 144. The machine learning system trains 144 using the model inputs 142 to generate the trained AI model 202.

Model Inputs

The model inputs 142 can be received in the form of a video gameplay log or otherwise collected during gameplay or while reproducing a gameplay session. The model inputs can include an image 204 of a map, positions of objects in the game environment, or other spatial data. The image 204 can be, for example, a frame from the video output of a video game, such as frame 400 shown in FIG. 4A. In some embodiments, the image can be a lower resolution or simpler version of the frame 400, such as shown by simplified image 410 in FIG. 4A. The image can also be similar to the images shown in FIG. 4B. The image can also be for example, a foveated polar image representation view image, such as shown by retina view image 500 in FIG. 5A. The image can also be formatted as a matrix, such as shown by matrix image 510 in FIG. 5A. The image can also be formatted as any other type of data structure for showing positional or spatial information. For training the machine learning system 144, the image can be focused on a video game character controlled by a person.

For training an AI model in for a hockey video game, the image can show the relative positions of teammates, members of the opposing team, the puck, the goal, and the ice rink boundary. In other video games, the image can show the relative spatial positions of other decision-affecting objects in the video game environment.

Other model inputs 206 can include non-positional, non-spatial situation data. For example, in the hockey video game, the other model inputs 206 can include the directions that hockey players are facing, which hockey player is being controlled by a person, the speed of the hockey players, who is on defense and offense, who the puck carrier is, whether the puck carrier is controlled by a person, how much time is left in the period, which players are goalies, how many players are in the game (such as player v. goalie shootout mode, 2v2, 3v3, and the like), in-game time, and any other present or past game state information that is not captured by the image but could affect the decision making of the player.

Other model inputs include the human control inputs 208. The control inputs 208 can be collected for each state of a video game while a person plays the video game. The human control inputs 208 can include, for example, directional inputs along a first axis (such as up/down) or provided to a first joystick (such as a left joystick), second directional inputs provided along a second axis (such as left/right) or provided to a second joystick (such as a right joystick), whether buttons (such as A, B, X, Y, Z, Δ, , O, left bumper, right bumper, start, select, turbo, mouse clicks, finger taps, and the like) are pressed to cause a unit in the video game to perform an action (such as pass, shoot, deke, speed up, block, check, spin, and the like). The human control inputs 208 can be provided through a variety of input devices and input formats, such as through a controller, through a mouse and keyboard, through voice commands, through a touchscreen, and the like.

Each human control input can be associated with a respective image 204 indicating positional data and respective non-positional data 206. The model inputs 142 can be provided to the machine learning system 144 to train the machine learning system 144 to learn how to control an in-game unit. To analyze the image 204, the machine learning system can perform convolution analysis on the image 204. The machine learning system can learn the controls 208 to apply to the in-game unit to cause the in-game unit to behave as though controlled by a person whenever the positions of units and non-positional situation are similar to positions and situations provided in the model inputs. After training the machine learning system with model inputs 142 for one or more periods of video gameplay, the machine learning system can generate a trained AI model.

Using the Model

Figure 2B:
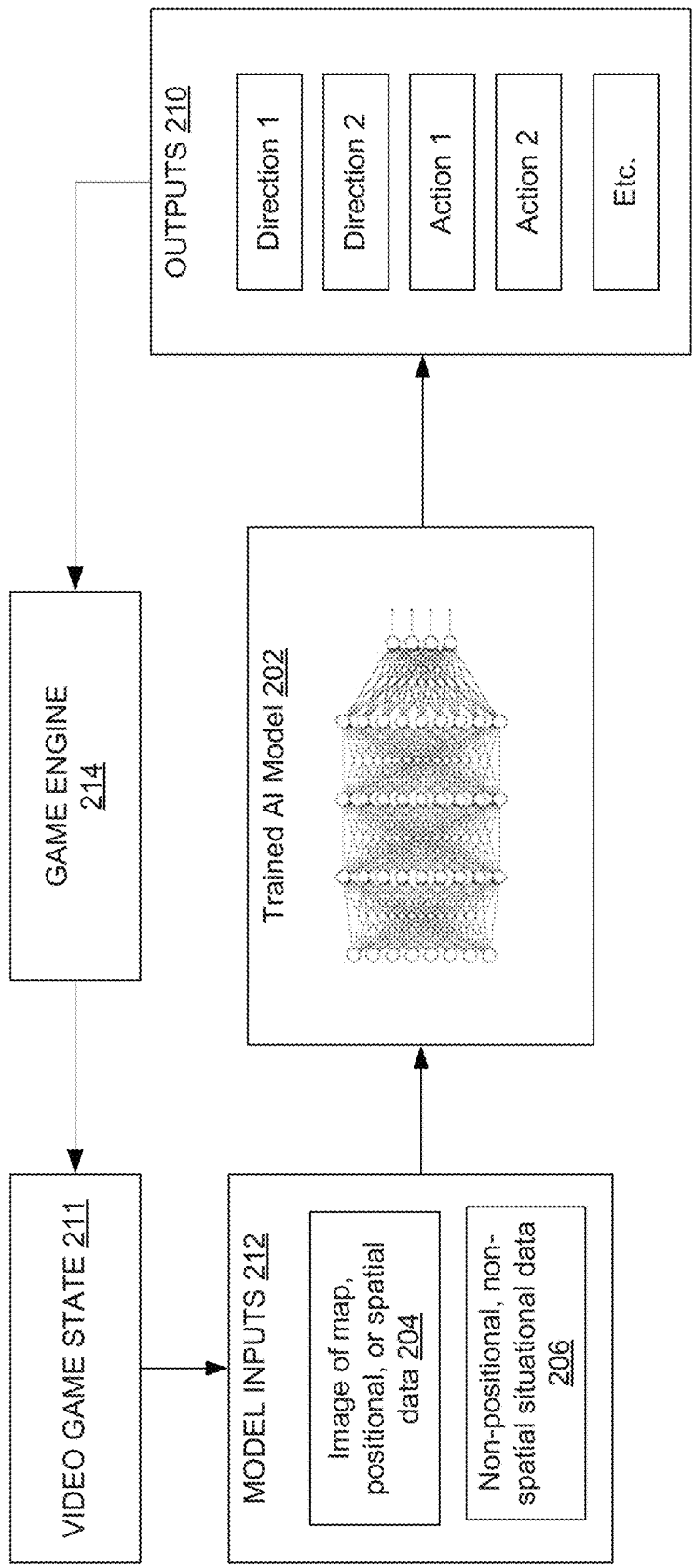
FIG. 2B shows an example of the trained AI model used to generate outputs.

FIG. 2B shows an example of the trained AI model 202 used to generate outputs 210. The outputs 210 can be used to control an NPC in a video game while the video game is being played and executed by a video game engine 214.

As the video game is being executed by the game engine 214, the state 211 of the video game can be used to generate model inputs 212 including an image 214 including spatial or positional information of objects in the video game environment and data 216 about non-positional or non-spatial information. The video game state 211 can include information similar to the data logged by the state capture application 116 shown in FIG. 1, but unlike the data logged by the state capture application 116, the video game state 211 can omit user inputs in some embodiments. These model inputs 212 can be dynamically generated for each moment in a game where an NPC is configured to behave as though controlled by AI. The model inputs 212 shown in FIG. 2B can be formatted the same or similar the model inputs 142 described in FIG. 2A. For example, if retina images 204 were used to train the machine learning system 144 shown in FIG. 2A, then the trained AI model 202 can also be configured to receive retina images 204. For generating controls for an NPC in a video game, the image 204 can be focused on the NPC. Based at least in part on the inputs, the trained AI model 202 can then generate outputs 210.

Based on the image including positional data and the non-positional data, the trained AI model can determine controls for an NPC to execute. The controls can include movements (such as up, down, left, right), buttons (such as A, B, X, Y, Z, Δ, ◊, O, left bumper, right bumper, start, select, turbo, mouse clicks, finger taps, and the like), or actions associated with the buttons (such as pass, shoot, deke, speed up, block, check, spin, and the like).

The generated outputs 210 can be provided to the game engine 214 to control the actions of an NPC. By causing the NPC to perform actions associated with the input buttons, the game engine can create the illusion that the NPC is controlled by a person.

Generating Model Inputs to Train the Machine Learning System

Figure 3:
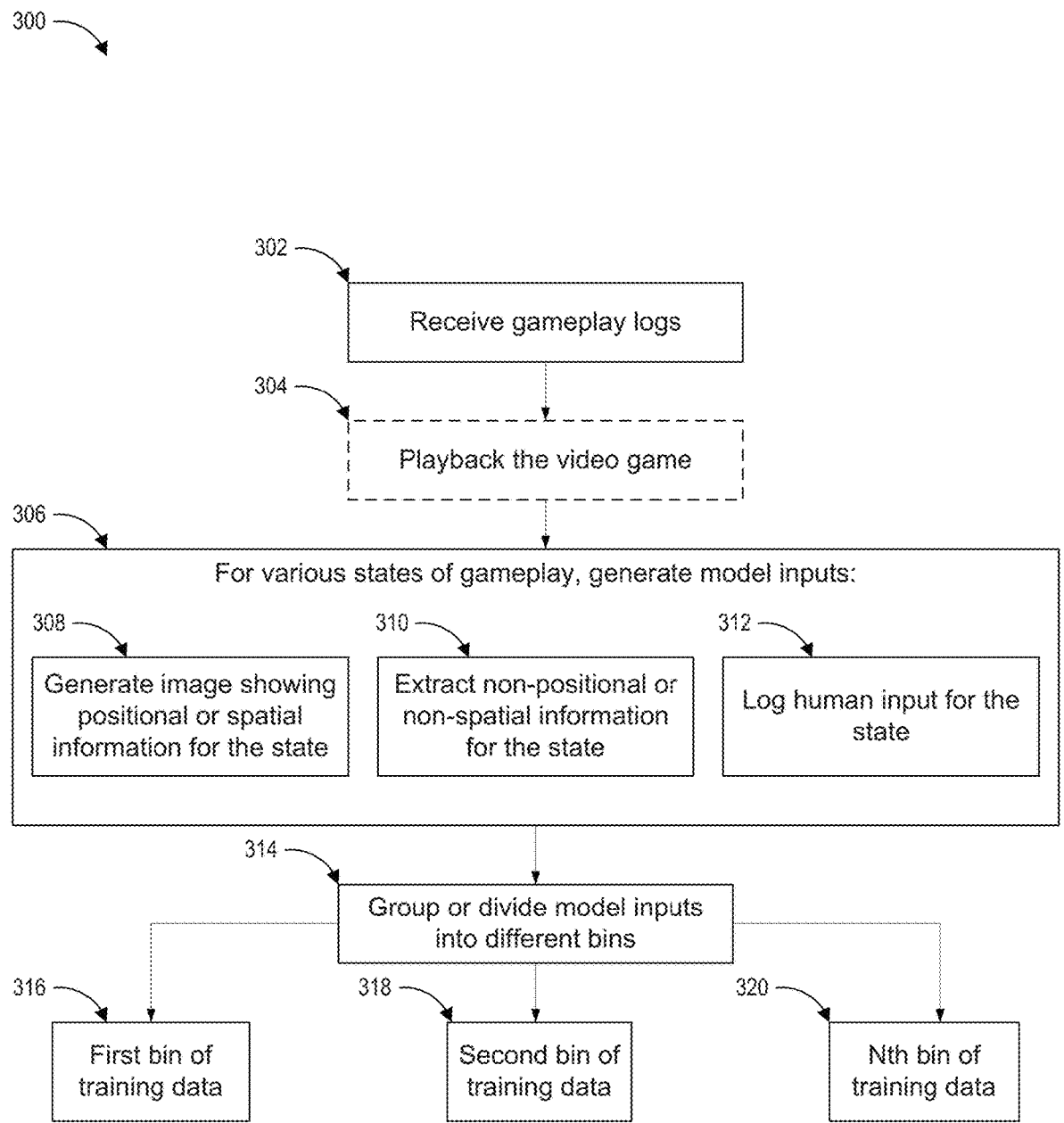
FIG. 3 shows a flowchart of an example process for generate training data based on video gameplay logs.

FIG. 3 shows a flowchart 300 of an example process for generate training data based on video gameplay logs.

At block 302, video gameplay logs can be received. For example, the video gameplay logs can be generated by a state capture application 116 as shown in FIG. 1. A variety of game states can be captured and logged. In some embodiments, the video game can be played by people with or against other people. In some embodiments, the video game can be played by people with or against NPCs. The video game can be played repeatedly, and video gameplay logs can be received for each of the gameplay sessions. To improve the speed of training an AI, the video game can be played by highly skilled people, and portions of the video game can be repeatedly played to perform certain tasks. By receiving a plurality of logs of repeated gameplay of certain tasks, a machine learning system can have more data samples to train with. For example, in a hockey video game, a person can repeatedly practice a 1v1 situation on offense to generate a plurality of video gameplay logs for training the machine learning system how to play 1v1 on offense. The gameplay can also include a variety of roles. For example, the gameplay can include scenarios where a person is controlling a puck carrier and scenarios where a person is controlling a non-puck carrier on offense. To capture gameplay where the person is controlling a non-puck carrier on offense, some video games can be set to "lock" the person-controlled unit to a particular hockey unit instead of automatically giving control of the puck carrier to the person.

In some embodiments, the video gameplay logs can include sufficient information to playback the video game. For example, the video gameplay logs can include the inputs provided by people to control characters, as well as the responses of NPCs in the game, and random number seeds, and events that occurred during the gameplay. In some embodiments, the video gameplay logs can include an image.

At block 304, the video game can be played back, such as by an application host system 132 on the second computing system 130 as shown in FIG. 1. The video game can be played back using the gameplay logs.

At block 306, model inputs (such as model inputs 142 shown in FIG. 1 and FIG. 2A) can be generated for each state of the gameplay where a person provides control input. In some embodiments, the model inputs or portions thereof can be extracted directly from the replay logs without relying on the playback of the video game in block 304. In some embodiments, the model inputs or portion thereof can be extracted while the video game is being played back in block 304. Block 306 can include blocks 308, 310, and 312. The information generated in each of blocks 308, 310, and 312 for each state of the video game can be associated with each other such that, for each state, it can be determined which control inputs were provided by the person, where in-game objects were spatially positioned, and non-spatial information about the state of the game.

At block 308, an image showing positional information for a state of the gameplay can be generated or captured. For a hockey video game, the image can show the relative positions of teammates, members of the opposing team, the puck, the goal, and the ice rink boundary. An image can include, for example, a frame (such as frame 400 in FIG. 4A) captured as video output during gameplay. The image can be modified to simply the image or lower the resolution (such as shown by simplified image 410 in FIG. 4A). The image can also be a separately generated image (such as a foveated polar image representation, for example, retina image 500 in FIG. 5A) that is different from the video output shown to people. The image can also be converted into a different data structure (such as matrix image 510 in FIG. 5A). Other types of images showing positional or spatial information of objects within the virtual environment of the video game can also be used. In block 308, the image can be focused on the human-controlled character. For example, the retina image can be centered on the human-controlled character, or a matrix image can be based on a retina image centered on the human-controlled character.

At block 310, non-positional or non-spatial information can also be extracted for each state. The non-positional or non-spatial information can include game state information that is not reflected in the image but may affect a person's decision making process for controlling a character. For example, in the hockey video game, the other model inputs 206 can include the directions that hockey players are facing, which hockey player is being controlled by a person, the speed of the hockey players, who is on defense and offense, who the puck carrier is, whether the puck carrier is controlled by a person, how much time is left in the period, which players are goalies, how many players are in the game (such as player v. goalie shootout mode, 2v2, 3v3, and the like), in-game time, and any other present or past game state information that is not captured by the image but could affect the decisions of the person, and may be a subset of the non-positional or non-spatial information from the video gameplay logs that are sufficient to reproduce a state of the game.

At block 312, the human input for each state can be extracted. This can include, for example, directional inputs along a first axis (such as up/down) or provided to a first joystick (such as a left joystick), second directional inputs provided along a second axis (such as left/right) or provided to a second joystick (such as a right joystick), whether buttons (such as A, B, X, Y, Z, Δ, ◊, O, left bumper, right bumper, start, select, turbo, mouse clicks, finger taps, and the like) are pressed to cause a unit in the video game to perform an action (such as pass, shoot, deke, speed up, block, check, spin, and the like).

At block 314, the model inputs from block 306 can optionally be grouped or divided into different bins based on the roles or actions occurring during video gameplay. In some embodiments, different bins can be used to facilitate machine learning speed or to generate different AI models. For video gameplay of a hockey game, there can be different bins for when the human-controlled character is on offense, when the human-controlled character is on defense, when the puck is loose, for 2v2 matches, for 5v5 matches, during fast breaks, during the last minute of the game, when the human-controlled character is the puck carrier, when the human-controlled character is not the puck carrier, and the like. The bins can be categorized with a plurality of labels at varying levels of specificity or hierarchy (such as a bin for gameplay of offensive fast breaks in 5v5 matches). In some embodiments, model inputs associated with a section of gameplay can be grouped into more than one bin.

Some bins of data can include preceding gameplay. For example, a bin of training data for "shooting" can be created to generate an AI model to decide when an NPC should shoot. The shooting training data can include all gameplay events where a person presses the "shoot" button. However, the shoot button is rarely pressed and would usually include a single or very few frames during which the shot button is pressed. Accordingly, a few seconds of gameplay before each corresponding shot can also be included in the bin of training data for shooting. Accordingly, the model inputs can be divided into training data for a first bin 316, a second bin 318, an any Nth number of bins 320.

In some embodiments, the flowchart 300 can be used to collect bins of training data from different people. For example, the different people can include people with different playstyles, professional gamers, professional athletes, and the like. At block 302, gameplay logs of video gameplay from different can be received, and at block 314, the model inputs can be divided into different bins based partially on who was playing the video game. The bins of data can be later used (e.g., as described with respect to FIG. 6 and FIG. 7) to generate and play against AI models that emulate the playstyles of those different people.

Example Image Formats

FIG. 4A, FIG. 4B, FIG. 5A, FIG. 5B, and FIG. 5C show example image formats. Images in these various formats can be generated (such as described with respect to block 308 of FIG. 3 and block 704 of FIG. 7) and used as model inputs (such as model inputs 142 of FIG. 1, model inputs 204 of FIG. 2A, and model image 204 of FIG. 2B).

FIG. 4A shows an example frame 400 and a simplified version 410 of the frame 400. Frame 400 can be captured from the video output displayed to a person when running a video game. Frame 400 can be reused without separate image generation or image processing, saving processing power. The frame 400 may include details unnecessary for training machine learning system and include complexity that may in fact slow down the machine learning process.

Image 410 is a simplified or lower resolution image of frame 400. For example, as compared to frame 400, the characters are represented as simpler white or dark (or other colored) shapes such as circles, the audience is removed, logos on the ice are removed, and advertisements on the boards are removed. Shadows, lighting, and other graphical effects can be omitted. Although image 400 and image 410 are shown in black and white, embodiments of either image 400 or image 410 can include color. In some embodiments, image 410 can be separately generated from frame 400. In some embodiments, image 410 can be generated based on frame 400. In some embodiments, the simplified image can be from a different viewpoint than the frame 400.

FIG. 4B shows additional examples of simplified images. Characters can be represented with different colors or shapes (such as X's and O's) on a field from different views. Image 420 shows a bird's eye view. Image 430 shows a perspective view from behind the goalie.

FIG. 5A shows an image in a retina format and in a matrix image format. The retina format shows a foveated polar image representation of positional information. The retina image 500 can be shown from a bird's eye view, but other appropriate viewpoint can be used depending on the application, such as an isometric view, a first person view can be used, a 2D view, a ¾ view, and the like. The retina image 500 can be generated based on a frame of the video game (such as frame 400 of FIG. 4A), a simplified or lower resolution image of a frame (such as image 410 of FIG. 4A), or separately generated based on a state of the game or based on video gameplay log data. The example retina image 500 in FIG. 5A includes a plurality of lines 502, 504 that divide the retina image into cells. Some lines 504 form concentric polygons, ellipses, or other shapes focused on a common center. Other lines 502 radiate outward from the center and intersect the concentric shapes to form cells. In some embodiments, there can be more or fewer lines 502, 504 to divide the retina image 500 in to more or fewer cells to achieve a higher or lower retina resolution, or the lines dividing the retina image 500 can form a grid or any other type of division of cells. In some embodiments, the retina image can include a plurality of rings and lines that divide the rings into cells shaped like wedges, arcs, or other conic sections. The cells can be triangular, quadrilateral, elliptical, or any other type of polygon or shape or combination of shapes. In some embodiments, the resolution can be 8 rings by 8 slices for a 64 cell retina resolution, 10 rings by 10 slices for a 100 cell retina resolution, and the like. The retina resolution can be lower than the resolution of the images that make up the video output, which typically varies between 800×600 resolution to high definition 1920×1080 resolution.

The cells of the retina image 500 can indicate objects located in each cell. Cell 507 can be colored or include data values to indicate the location of the goal, cell 508 can be colored or include data to indicate the location of a teammate, and cell 509 can be colored or include data to indicate the location of an opponent. In various embodiments, the retina image can indicate locations of the ice rink boundaries, the goal, teammates, and opponents, and the puck, the referee, faceoff spots, rink center, goalies, obstacles, field markers, or any other in-game object that may influence decisions. In various embodiments, to represent the different categories of objects at each position, the cells 507, 508, and 509 can be filled with different colors, shapes, patterns, or otherwise visually distinguished. In some embodiments one cell can include a plurality of channels (such as channels for red, green, and blue) indicating a plurality of objects positioned in each cell, where each channel is used to indicate a different type of object. Some embodiments can include 20 or more channels. The retina image can have a lower retina resolution to make it easier for a machine learning system to process as compared to the video output from the video game.

The retina image 500 can be focused on a unit in the game. This can include centering the retina image 500 on the unit. Focusing on the unit can also include centering the concentric shapes on the unit. Lines 502 can also stem from the focused unit to create lanes 505 that include a plurality of cells projecting outward from the focused unit. When preparing model inputs for training a machine learning system, the retina image can be focused on a unit controlled by a person. When preparing model inputs for providing to an AI model to generate controls for an NPC, the retina image can be focused on the NPC that the AI model will be used to control.

The retina image 500 can be used instead of the images shown in FIG. 4A and offer a number of advantages. The example retina image 500 includes more easily processed patterns for a machine learning system to detect. This includes detecting whether passing lanes are open or not. Using a polar format such as shown in FIG. 5A, lanes can be easily detected from a variety of positions or angles. If a rectangular grid system is used, a machine learning system may different types of filters to detect a diagonal lane as opposed to a horizontal or vertical lane, making the machine learning process slightly more difficult. The example retina image 500 can also be lower resolution than video output from a video game.

In some embodiments, the retina image 500 also uses blinding to remove distracting data that might otherwise slow down the machine learning process. For example, a video gameplay log may indicate that a human-controlled unit is at coordinates (X1, Y1), that teammate #1 is at coordinates (X2, Y2), and that teammate #2 is at coordinates (X3, Y3). The retina image 500 can show the relative positions of characters or other objects without identifying which numbered teammate is at which position. For example, all teammates can be indicated with green cells. In some embodiments, if a teammate is positioned to shoot and score, an AI model should recognize that fact and output controls to cause a pass to the teammate, regardless of whether the positioned teammate is teammate #1 or teammate #2. Accordingly, the retina image 500 can reduce the volume of data, including immaterial data, which a machine learning system will process. In some embodiments where a specific identity or abilities of an individual unit matters (such as whether the unit has high speed or power), the identity or abilities of the individual unit can be included in the retina image 500 or as a part of non-positional data.

Figure 5B:
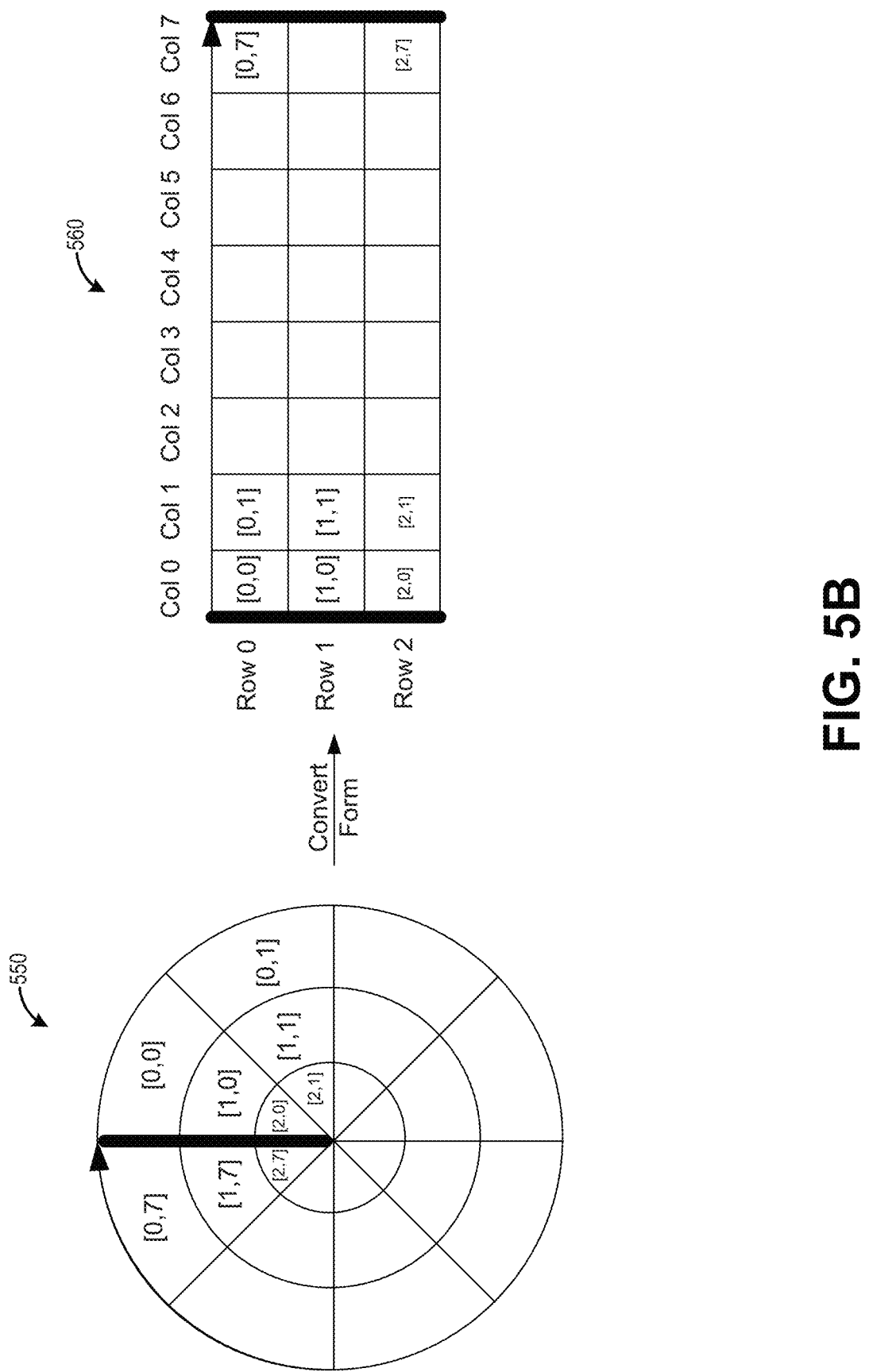
FIG. 5B shows an example mapping format between retina image format and matrix image format.

The retina image 500 can be modified to convert the image format into a matrix image format according to the mapping shown in FIG. 5B. The matrix image 510 can be an actual picture, a mathematical matrix, or a data structure. The elements 507', 508', and 509' of the matrix image 510 correspond to the cells 507, 508, and 509 of the retina image 500. Unoccupied positions are shown in the matrix image 510 with a solid black color. The elements of the matrix image 510 can be colored or otherwise visually distinguished. In some embodiments, the matrix image 510 can be a mathematical matrix data structure, where the value of each element indicates the presence of an in-game object at a physical location represented by the cell.

FIG. 5B shows an example mapping format between a retina image format and a matrix image format. A division layout 550 for a retina image includes three concentric circles sliced along their diameters by four lines to cut each circle into eight pie-shaped slices. Altogether, the layout 550 includes wedge-shaped and pie-shaped cells. Each cell can be assigned a numeric label in the format of [Row, Column]. The [Row, Column] label can correspond to the rows and columns of a matrix 560.

Accordingly, a retina image such as retina image 500 can be converted into a matrix image 510 according to a mapping scheme shown in FIG. 5B. Other mapping schemes can be used. For example, the row or column numberings can be switched or backward, or the matrix can be inverted or transposed or otherwise modified. Any mapping scheme that provides a 1-to-1 mapping can work, although schemes that preserve a sense of the spatial relationship of rows and columns can enable faster machine learning. In some embodiments, a multiple to one, one to multiple, or multiple to multiple mapping schemes can be used. In various embodiments, the matrix can be rectangular or square.

FIG. 5A shows an embodiment featuring one cell for each object. In some embodiments, a plurality of cells can be marked to indicate relative positions between the character in focus and an object in the game environment. For example, the entire lane from the center of the retina image 500 up to the cell 507 can be colored as white, and the corresponding matrix 510 can have a corresponding plurality of squares filled as white.

The example in FIG. 5A shows individual cells 507, 508, and 509 marked with different patterns to indicate the presence of different, individual objects in each cell. In some embodiments, the cells can be indicated with different colors instead of patterns. A situation may arise where multiple in-game objects occupy a position included in a cell. In such a situation, the cell in the retina image 505 can be visually distinguished to indicate the presence of multiple objects. If a coloring scheme is used to indicate the positions of different types of objects in the retina image, then a cell can include a mixed color to indicate the presence of multiple objects within the cell. If a pattern scheme is used to indicate the positions of different types of objects in the retina image, then a cell can include overlapping patterns. In some embodiments, a scheme can include unique visual indicators for various combination of objects located within cells.

FIGS. 5A and 5B show retina images and matrix images with a number of concentric layers and a number of slices dividing the concentric shapes resulting in a number of cells for a limited field of view. However, in other embodiments, the retina images and matrix images can have more or fewer numbers of concentric layers that are divided into more or fewer cells for higher or lower resolutions, and the field of view can be greater or smaller. Although retina images are shown, in some embodiments, the matrix images such as 510 and 560 can be generated based on game state data. The matrix images can be generated without first generating a retina image, and the matrix images can be generated without using video output data.

Figure 5C:
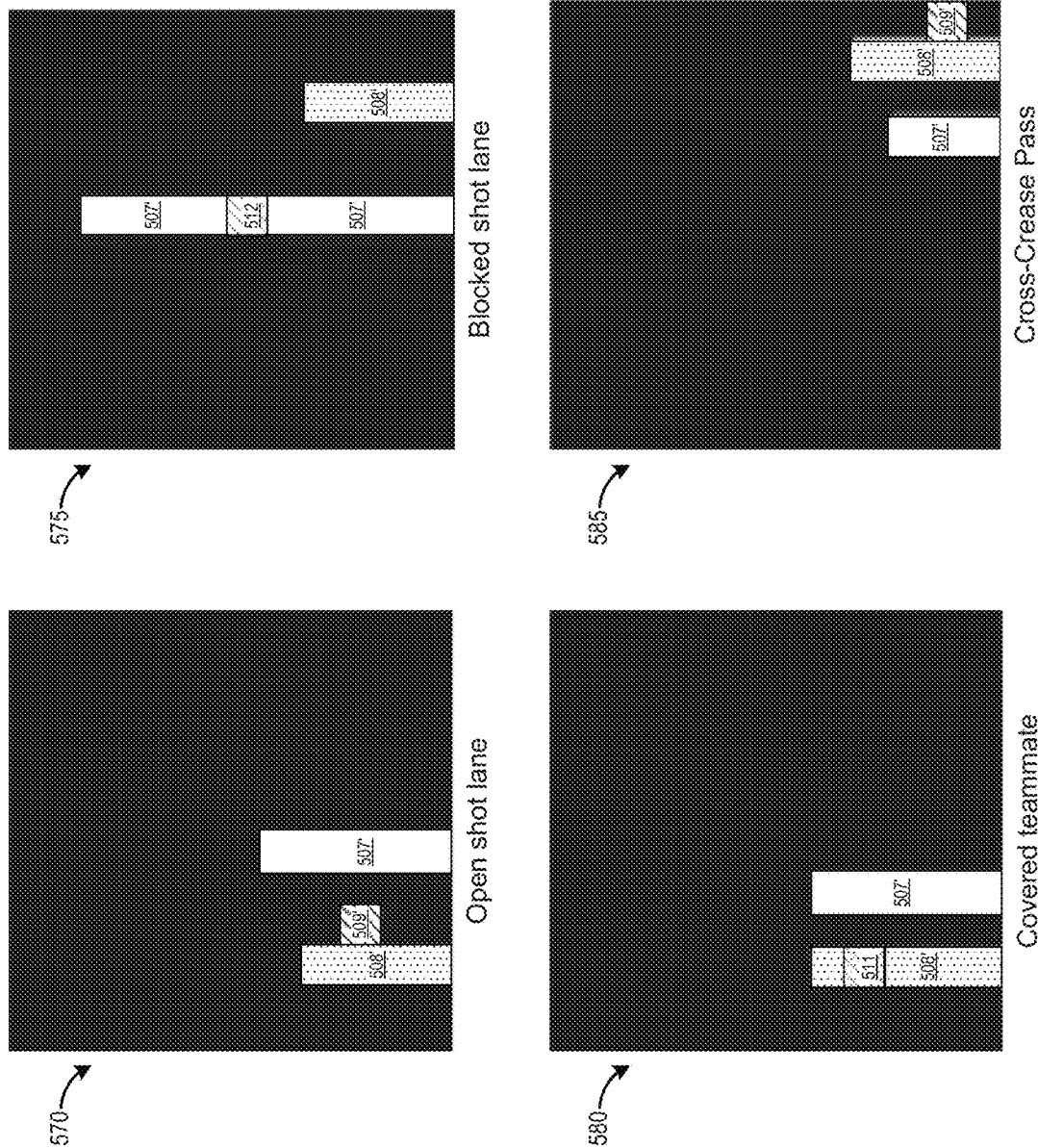
FIG. 5C shows example matrix images indicating positions of objects in a hockey game under different scenarios.

FIG. 5C shows example matrix images 570, 575, 580, 585 indicating positions of objects in a hockey game under different scenarios. The matrix images 570, 575, 580, and 585 are generated based on the retina image structure shown FIG. 5A. In the example matrix images shown in FIG. 5C, a first visualization 508' indicates and is mapped to a position of a teammate and the position of the lane between the teammate and the character in focus. A second visualization 507' indicates and is mapped to a position of an opposing player and the position of the lane between the opposing player and the character in focus. A location of the goal is indicated by third visualization 509'. Another visualization 511 is shown as the striped pattern 509' overlapping and combined with the dotted pattern 508'. Another visualization 512 is shown as the striped pattern 509 overlapping and combined with the white pattern 507'. Although patterns and overlapping combinations of patterns are shown in FIG. 5C, in some embodiments, the matrix elements can be visualized with colors and overlapping combinations of colors or shapes. In some embodiments, the matrix elements can be represented with data values such as RGB encodings for colors, or such as b'0001 for a teammate, b'0010 for the goal, b'0011 for a teammate and the goal, and so on. The matrix images in both FIGS. 5A and 5B use matrix elements to show the relational positions of in-game objects, including the relational positions of the goal, teammate, and opponent to each other and to an NPC.

The matrix images 570, 575, 580, and 585 show different positional scenarios that might occur during a hockey game. Matrix image 570 shows an open shot lane to the goal between a character in focus and the goal. In comparison, matrix image 575 shows a blocked shot lane, where the goal position 512 is located in a lane between a character in focus and an opposing player 507'. Matrix image 580 shows a scenario where a teammate is covered and not open to receive a pass. Matrix image 585 shows a scenario where a teammate is open to receive a cross-crease pass. Accordingly, the various matrix images 570, 575, 580, and 585 are visibly distinct under different scenarios. A machine can be trained to distinguish the scenarios much faster than a machine can be trained to distinguish more complex images, such as frame 400 of FIG. 4A.

Training a Machine and Generating AI Models

Figure 6:
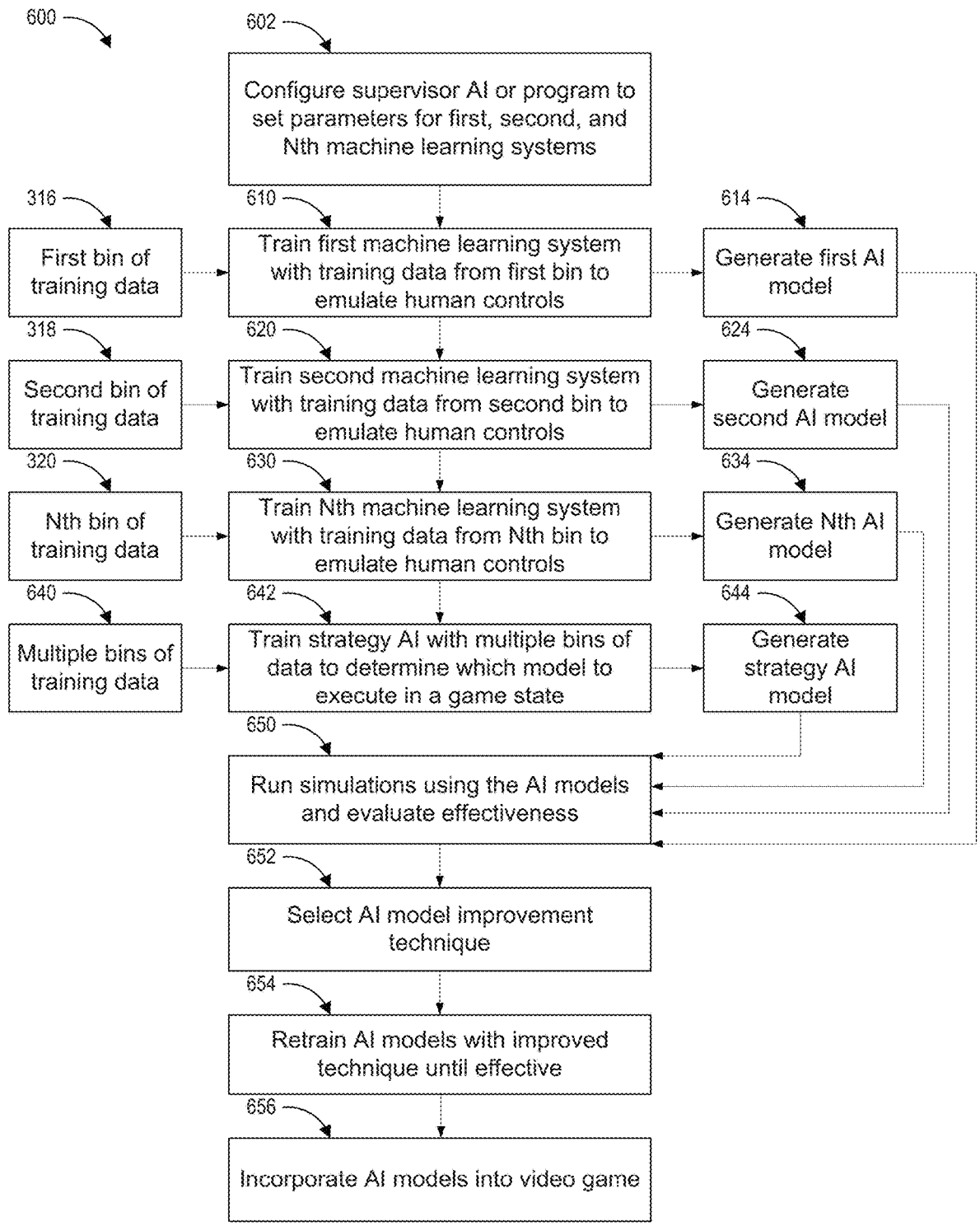
FIG. 6 shows a flowchart of an example process for training a machine and generating AI models.

FIG. 6 shows a flowchart 600 of an example process for training a machine and generating AI models. Although not specifically indicated, some steps shown in the flowchart 600 can be optional. In various embodiments, some of the AI functionality can be implemented using software rules instead. For example, in some embodiments, a first AI model can be used for offense and a second AI can be used for defense, while in other embodiments, a first AI model can be used for offense while hard coded software rules can be used for defense. As another example, for some hockey games, an AI model can be used for offense, except that some specific offensive tasks such as shooting can be programed as hard coded software rules.

At block 602, a supervisor AI or program can be configured to set a plurality of machine learning parameters for one or more machine learning systems. The one or more learning systems can include a first, second, . . . Nth machine learning system, and a machine learning system for training the strategy AI. The supervisor AI or program can be configured to select one or more types of machine learning system or machine learning techniques. Examples types of machine learning systems include a convolutional neural network, a supervised learning network, a decision tree learning system, a deep learning network, and the like.

The supervisor AI or program can also be configured to adjust parameters for the selected type of machine learning system. For example, if a convolutional neural network is selected, then the supervisor AI or program can be configured to select a filter size, number of layers, pooling options, neuron connections, weighting, and the like. The supervisor AI or program can also vary what training data to look at, including the resolution of the retina image or matrix image or the number of rings or slices in the retina image.

Some types of machine learning configurations or systems (such as a convolutional neural network) are better at analyzing certain types of data (such as images) to determining controls for certain actions (such as for determining movements). Other types of machine learning configurations are better at determining controls for other actions (such as shooting). Some types of machine learning configurations, such as a feed forward network, perform better on data inputs instead of images, but feed forward networks can have scaling problems when the quantity of data or variables becomes very large.

In some embodiments, convolutional neural networks, which receive images as inputs and apply filters to the images, can be trained quickly and generate AI models capable of outperforming programmer-coded AI algorithms. The convolutional neural networks can turn many positional questions into visual analysis problems.

The supervisor AI or program can be configured to try a variety of configurations for machine learning systems such that a best result can be selected. For example, the first bin of training data 316 can be used to repeatedly train a first machine learning system in block 610. The first machine learning system can be a convolutional neural network having 5 layers and first filter size for a first machine learning attempt, and then the first machine learning system can be adjusted to have a different number of layers or different filter size for a second machine attempt still using the same first bin of training data 316. The AI model generated at block 614 from the first machine learning attempt can be compared with the AI model generated at block 614 during a second machine learning attempt, and the two generated AI models can be evaluated to see which is more effective.

The supervisor AI or program can be configured to try combinations of machine learning systems. For example, the first machine learning system can be configured to apply a convolutional neural network analysis to an image and to apply a different type of machine learning technique to non-positional, non-spatial situational data that is received.

One or more bins of training data, including the first bin of training data 316, second bin of training data 318, up to an Nth bin of training data 390 such as described with respect to FIG. 3, can be received and provided to machine learning systems. Each bin of training data can include the model inputs 142 described with respect to FIG. 2A. The machine learning systems can use the bins of training data to learn what offensive contexts are, what passing options are available, when shooting is appropriate, and other actions without being specifically coded with mathematical and logical software rules written by a programmer.

At block 610, a first machine learning system can be trained to emulate human controls using the training data from the first bin 316. The first machine learning system can be configured by the supervisor AI or program at block 602. The first machine learning system can then generate a first AI model 614 that is configured to determine controls that emulate the controls of a person in various gameplay scenarios. For example, if the first bin of training data included model inputs for a hockey game where a human-controlled character was on offense, then the first model can be used to generate controls to apply to a NPC on offense such that the NPC behaves similarly to a human-controlled character.

At block 620, a second machine learning system can be trained to emulate human controls using the training data from the second bin 318. The second machine learning system can be configured by the supervisor AI or program at block 602. The second machine learning system can then generate a second AI model 624 that is configured to determine controls that emulate the controls of a person in various gameplay scenarios. For example, if the second bin of training data included model inputs for a hockey game where a human-controlled player was on defense, then the second model can be used to generate controls to apply to an NPC on defense such that the NPC behaves similarly to a human-controlled character.

At block 630, an Nth machine learning system can be trained to emulate human controls using the training data from the Nth bin 318. The Nth machine learning system can be configured by the supervisor AI or program at block 602. The Nth machine learning system can then generate an Nth AI model 634 that is configured to determine controls that emulate the controls of a person in various gameplay scenarios. For example, if the Nth bin of training data included model inputs for a hockey game where the puck was loose, then the Nth model can be used to generate controls to apply to a NPC when the puck is loose such that the NPC behaves similarly to a human-controlled character.

In some embodiments, the bins of data can include different types of data important for different types of AI models. For example, a machine learning system for generating an AI for loose puck scenarios can be provided with data including the locations of teammates, opponents, and the puck shown as different colors on a retina image, along with the speeds and directions that the units and puck are moving, without information about the position of the goal. In comparison, a machine learning system for generating an AI to control a puck carrier can be provided with data including the locations of teammates, opponents, and the goal as different colors on a retina image, along with the speeds and directions of the units, without separately providing information about the location of the puck (inherently the same position as the puck carrier) or the direction of the puck. As another example, a machine learning system for generating an AI to control a defender can be provided with data including the locations of teammates, the goal, the puck carrying opponent, and opponents without the puck as different colors on a retina image, along with the speeds and directions of the units.

At block 640, another machine learning system can be trained to determine, based on whether a current game state is most like the states in bins 316, 318, 320, which generated AI model should be activated. The machine learning system can be configured by the supervisor AI or program at block 602. The machine learning system can then generate a strategy AI model 644. For example, if at block 314 in FIG. 3, some model inputs were grouped into a bin for offensive fast breaks, and other model inputs were grouped into a bin for cross-crease passes, then the strategy AI can determine whether a state of gameplay is more similar to a fast break scenario or a cross-crease pass scenario, and in response, execute the respective model (e.g., one of the Nth models 634).

In some embodiments, there can be any number of machine learning systems. In some embodiments, there can be a plurality of machine learning systems to generate AI models for an NPC puck carrier. For example, there can be machine learning systems to generate AI models: to determine whether to shoot or pass or skate as a puck carrier, for shooting as a puck carrier, for passing as a puck carrier, for skating as a puck carrier, for defense, for loose puck scenarios, and as an offensive teammate. There can also be AI models for specific game modes or when positioned in the offensive or defensive side of the field. The machine learning systems can also use different machine learning techniques to process different types of model inputs. For example, a retina image or matrix image can be processed by a convolutional neural network, while non-positional model input data can be processed by a (non-convolutional) dense neuron layers or feed forward network.

At block 650, simulations can be run using the AI models to evaluate their effectiveness. For example, an AI model controlled offense can be set to compete against people, against hard coded software rules, or against an AI model controlled defense. The AI model controlled offense can be evaluated, such as based on the number of points scored, number of turnovers, win rate, or other statistics. An AI model controlled defense could be similarly set up against people, against hard coded software rules, or against an AI model controlled offense. The AI model controlled defense can be evaluated, such as based on the number of points allowed, number of steals and interceptions, win rate, or other statistics. In some embodiments, the evaluation can include a qualitative review by a person to see if AI model controlled NPCs feel and behave like human-controlled units.

At block 652, a variety of AI model improvement techniques can be selected for improving the AI models 614, 624, 634, 644. As one technique, machine learning parameters can be adjusted based on the effectiveness of the generated AI model. For example, the first machine learning system with four layers of nodes can train 610 using the first bin of training data 316 for offensive scenarios to generate the AI models 614. The first machine learning can train 610 again using the first bin of training data 316 for offensive scenarios but with five layers of nodes to generate the Ai model 614. The two AI models 614 can be evaluated at block 650 to determine which is more effective (e.g., scores more points). The machine learning system can be adjusted to use a more effective number of layers of nodes for additional rounds of training. As another technique, reinforcement training algorithms can be applied, unsuccessful learnings can be penalized or discouraged, and the like. In some embodiments, additional training data can be collected and provided to machine learning systems to refine the AI models. The additional training data can include targeted gameplay scenarios where to teach the machine learning system to improve areas where the generated AI models are weak. For example, if the model for offense does not recognize cross-crease pass opportunities well, then the hockey game can be played to set up and execute cross-crease passes. The gameplay including cross-crease pass examples can be processed to generate the model inputs 142 as described in block 306 of FIG. 3, and the model inputs can be provided as appropriately binned training data to the appropriate machine learning system to improve the AI model for offense.

At block 654, the machine learning systems can be retrained to implement the selected model improvement technique until a threshold level or desired level of AI effectiveness is achieved.

Figure 7:
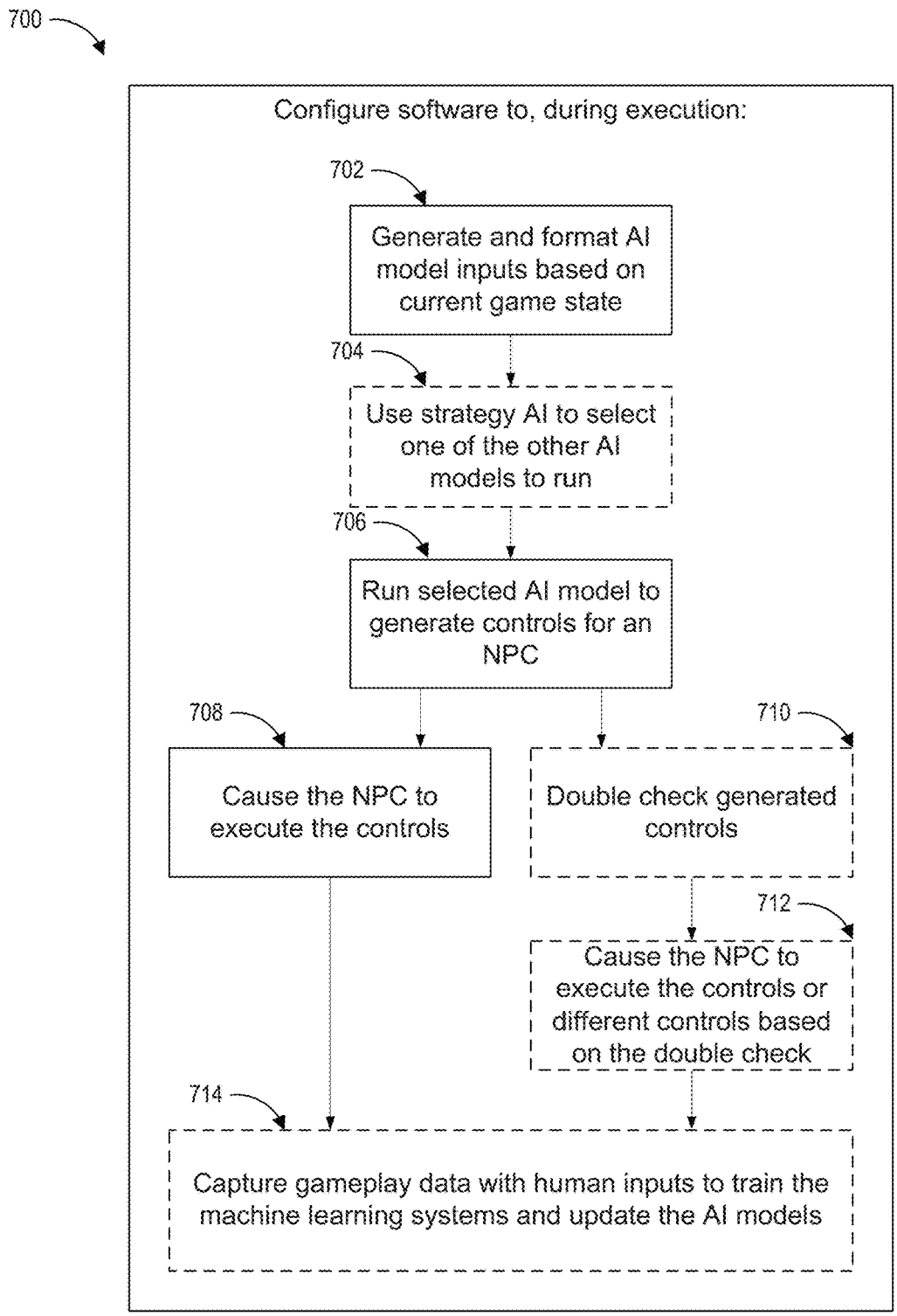
FIG. 7 shows a flowchart of an example process for configuring NPCs in a software environment to behave more like human-controlled units.

At block 656, the AI models can be incorporated into a video game to generate controls for NPCs to behave like human-controlled players, such as further described with respect to FIG. 7. This can include incorporating into the software code of the video game: code for formatting model inputs, code for selecting an AI model to use, and code for applying outputs of the AI models to control NPCs.

In some embodiments, some of the different bins of training data 316, 318, 320 include training data based on gameplay from different people. Using the different bins of training data 316, 318, 320, various AI models can be generated at blocks 614, 624, 634. By doing so, the AI models can be trained to emulate the playstyles of different people. For example, the first AI model can be generated at block 614 using data collected from a first player with a conservative playstyle, the second AI model can be generated at block 624 using data collected from a second player with an aggressive playstyle, and an Nth AI model can be generated using data collected from an Nth player who is a celebrity.

Using the AI Models

FIG. 7 shows a flowchart 700 of an example process for configuring NPCs in a software environment to behave more like human controlled units. A video game can be configured to use the AI models (such as models 614, 624, 634, 644 of FIG. 6). For FIG. 7, the flowchart will be described for a code for a hockey video game implemented as software on a non-transitory medium.

The code can be configured to generate and format AI model inputs (such as model inputs 212 shown in FIG. 2B) 702 in a similar way that the training data was generated in block 306 of FIG. 3. In FIG. 7, block 702 can include generating, based on a current game state, an image indicating positional information about objects in the game. The image can be in a same format as the images in the bins of training data 316, 318, 320, 640 and include the same types of positional information about the same types of objects used to train machine learning systems (such as in blocks 610, 620, 630, 642 of FIG. 6). The image can be, for example, in the formats shown in FIG. 4A, FIG. 4B, or FIG. 5A. The image can be frames output from the video game (such as frame 400 of FIG. 4A), or simplified versions or lower resolution versions (such as image 410 of FIG. 4A) of the frames. The image can also be separately generated based on the state of the game as a retina image (such as retina image 500 of FIG. 5A) or matrix image (such as matrix image 510). The retina image or matrix image can be focused on the NPC character that is to be controlled by the outputs of the AI model.

Generating the model inputs can also include generating non-positional, non-spatial information based on the game state. For example, as described with respect to block 206 of FIG. 2B, in a hockey video game, the model inputs can include the directions that hockey players are facing, which hockey player is being controlled by a person, the speed of the hockey players, who is on defense and offense, who the puck carrier is, whether the puck carrier is controlled by a person, how much time is left in the period, which players are goalies, how many players are in the game (such as player v. goalie shootout mode, 2v2, 3v3, and the like), in-game time, and any other present or past game state information that is not captured by the image but could affect the decision making for the NPC. The non-positional, non-spatial information can include the same types and format of non-positional, non-spatial information provided as part of training data in bins 316, 318, 320.

At block 704, if a strategy AI model is implemented, then the strategy AI model (or hard coded software rules, or combination of strategy AI and hard coded software rules) can be used to select one of the other AI models to run for controlling the actions of an NPC. For example, software rules can be hard coded to select an offense AI model if the NPC or a teammate has the puck, and select a defense AI model if the opponents have the puck. As another example, the strategy AI model can be used to select, in an offensive situation, whether a shooting focused AI model, a passing focused AI model, an aggressive playstyle AI model, a fast-break AI model, or other AI model should be selected. In some embodiments, the strategy AI can select to implement an AI model in certain scenarios (such as offense) and to implement the AI from hardcoded software rules in other scenarios (such as defense) depending on the strengths and weaknesses of the AI model compared to the AI from hard coded software rules.

In some embodiments, at block 704, an AI model can be selected based at least in part on the preferences of a person playing the video game. For example, a player of a hockey game may select to play against an AI trained based on data of players with aggressive playstyles, an AI trained based on data of players with conservative playstyles, an AI trained based on data from a professional video game player, an AI trained based on data from a celebrity, or an AI trained based on data from a friend.

At block 706, a selected AI model can be run to generate the controls or associated actions for a unit such as an NPC. The AI model can be provided the AI model inputs generated at block 702, and based on the model inputs, the AI model can generate one or more controls (or corresponding action) that should be similar to controls that a human might provide if controlling that unit. The controls can include, for example, directional inputs along a first axis (such as up/down) or provided to a first joystick (such as a left joystick), second directional inputs provided along a second axis (such as left/right) or provided to a second joystick (such as a right joystick), whether buttons (such as A, B, X, Y, Z, Δ, , O, left bumper, right bumper, start, select, turbo, mouse clicks, finger taps, and the like) are pressed to cause a unit in the video game to perform an action (such as pass, shoot, deke, speed up, block, check, spin, and the like).

At block 708, the NPC can be caused to implement the actions corresponding to the controls or actions from block 706. In some embodiments, an NPC can be emulated to behave as though providing specific inputs through a user interface device (such as up, down, button A, button B, and the like). In some embodiments, the NPC can directly an implement an action associated with an AI model output. For example, if button A is mapped to perform a pass, then the NPC can be caused to perform a pass without reference to any buttons.

In some embodiments, at block 710, the AI generated controls can be double checked to detect a negative consequence. In some embodiments, even if it can be difficult for a programmer to determine what a good or best behavior of an NPC is, the programmer can determine and easily check what bad behaviors are. Double checking can include, for example, implementing rules to prevent negative actions from happening. For example, if the AI generated control for an NPC includes passing a puck to a teammate, a rule can be written to detect if an opponent is in a passing lane between the NPC and the teammate, and if so, causing the AI to perform a different action or just not pass. In some embodiments, the hard coded rules to double-check the AI model control outputs can be sparsely implemented to avoid introducing glitch behavior or to avoid altering the human-like look and feel.

As another example of double checking the AI decision, the results of implementing the AI controls can be emulated at faster than gameplay speed to determine the consequences. For example, if an AI generated control for an NPC includes passing a puck to a teammate, the video game can emulate the pass, detect if the pass will be intercepted, and if so, cause the AI to perform a different action or just not pass. The video game can, for example, quickly emulate the result for up to a few in-game sections in the future in less than a human-detectable fraction of a real-time second.

At block 712, the NPC can be caused to execute the controls/actions associated with the controls based at least in part on the result of double checking in block 710, or to execute different controls or actions if a negative consequence is detected.

At block 714, the video game can capture human input as a part of gameplay data and transmit the gameplay data to a system (such as second computing system 130) configured to use the gameplay data as further training data to improve AI models. The gameplay data can be filtered (such as based on statistics, wins, score ratios, and the like) to include gameplay from highly skilled people or people with certain playstyles (such as aggressive styles, defensive styles, and the like).

AI Skill

In order to generate AI models (such as models 614, 624, 634, 644 of FIG. 6) that behave like skilled people, the gameplay logs (such as logs in 302) used to generate model inputs can include gameplay of skilled or professional gamers. In some embodiments, the AI models can compete and win against AI systems implemented as a hard coded software rules.

Various settings can be adjusted to lower the difficulty during training or after generating the AI model. For example, the resolution or field of view of images can be reduced during training or during gameplay. As another example, the image can be otherwise modified to introduce fog or reduce clarity. As another example, AI models created using different machine learning systems having different parameters (such as different filter sizes or different numbers of layers) may generate controls for controlling units at different skill levels. As another example, some AI models can be generated based on gameplay by lower skilled gamers. A plurality of AI models at different skill levels can be included or made accessible to a video game, and a corresponding AI model can be used based on a difficulty selection by a person.

Combinations of AI and Programmer Coded Algorithms

In some embodiments, some AI functionality described herein can alternatively be implemented in a programmer-coded algorithm instead of using AI models. For example, there can be code to select an AI model for offense if an NPC is the puck carrier or the human teammate is the puck carrier, to select an AI model for defense if the opponents have the puck, or to otherwise select an AI model for a loose puck scenario. Such code can be implemented as hard coded software rules instead of training an AI model to make the determination.

In some embodiments, hard coded software rules and AI models can be combined. For example, hard coded software rules can include code to select an AI model for offensive if an NPC or a human teammate is carrying the puck, and then an AI model can be used to decide whether the situation is similar to a fast-break scenario or setup for a cross-crease pass, and then run an AI model for that specific offensive scenario. As another example, an AI model can be generally used for offensive maneuvers, including directional controls, passing, and the like, except for shooting. The decision to shoot can be implemented according to hard coded software rules, for example, based on whether or not a puck carrier has a clear line of sight to the goal. Accordingly, a hockey video game can include both a combination of hard software rules and AI model controls for an NPC.

Training Data from Different Sources

To prepare a video game for hockey, video or replays from real hockey games, such as from the NHL, can be used to create model inputs. The positions of the hockey players can be converted into retina images or matrix images, and actions can be associated with each character. An AI model for a particular character in a hockey video game can be generated based at least in part on the movements of the corresponding real life hockey player such that an AI controlled NPC will behave similarly to the real life player. Accordingly, in some embodiments, model input data can be captured from real life events.

In some embodiments, model input data can be captured from other different applications. For example, gameplay logs can be captured and model inputs can be generated from video games made in different years, for different systems, or by different publishers.

Additional Disclosure

Some embodiments, include a method for creating an artificially intelligent actor to emulate human behavior in video games, the method comprising: receive gameplay logs of a video gameplay session; generating, based on the gameplay data, first situational data indicating first states of the video game; generating first control inputs provided by the human, the first control inputs corresponding to the first states of the video game; training a first machine learning system using the first situational data and corresponding first control inputs; and generating, using the first machine learning system, a first artificial intelligence model.

The method can also include: dividing gameplay into bins based on a role of or action performed by a human-controlled unit in the video game, wherein the first situational data is associated with a first task bin, and second situational data is associated with a second task bin; generating, based on the gameplay data, the second situational data indicating second states of the video game; and generating second control inputs provided by the human corresponding to the second states of the video game; training a second machine learning system using the second situational data and corresponding second control inputs; and generating, using the second machine learning system, a second artificial intelligence model.

The method can also include: training a third machine learning system based at least in part on the gameplay logs to determine, based on a state of the video game, whether the first artificial intelligence model or the second artificial intelligence model should be executed.

The method can also include wherein generating, based on the gameplay data, the first situational data comprises: generating an image format indicating a position of the human-controlled unit relative to other objects in an environment of the video game, wherein the image format is lower resolution than a frame of the video game that would be displayed on a video screen when the video game is executed on a computing machine. The image format can be divided into a plurality of regions, wherein each region is colored or marked based at least in part on types of objects from the environment of the video game located within each region. The plurality of regions can be divided based at least in part on: a plurality boundaries that are at least partially curved and concentric on division including the position of the human-controlled unit; arc-shaped, triangular shaped, wedge-shaped, or conic-section-shaped boundaries extending from a division including the position of the human-controlled unit; or at least two different shapes. The image format can be a matrix; a data structure; or a file format for storing pictures.

The method can also include configuring the machine learning system as a convolutional neural network or feed-forward neural network.

The method can also include: configuring the video game to, while the video game is being played, generate live situational data in a same format as a format of the first situational data and run the first artificial intelligence model using the live situational data to generate first controls to control a unit in the video game. The video game can be further configured to, while being played: extrapolate, at a speed faster than in-game-time, future in-game events that would result if the first controls were implemented by the unit in the video game; and cause the unit to act based on the first controls based at least in part on the future in-game events.

Example Hardware Configuration of Computing System

Figure 8:
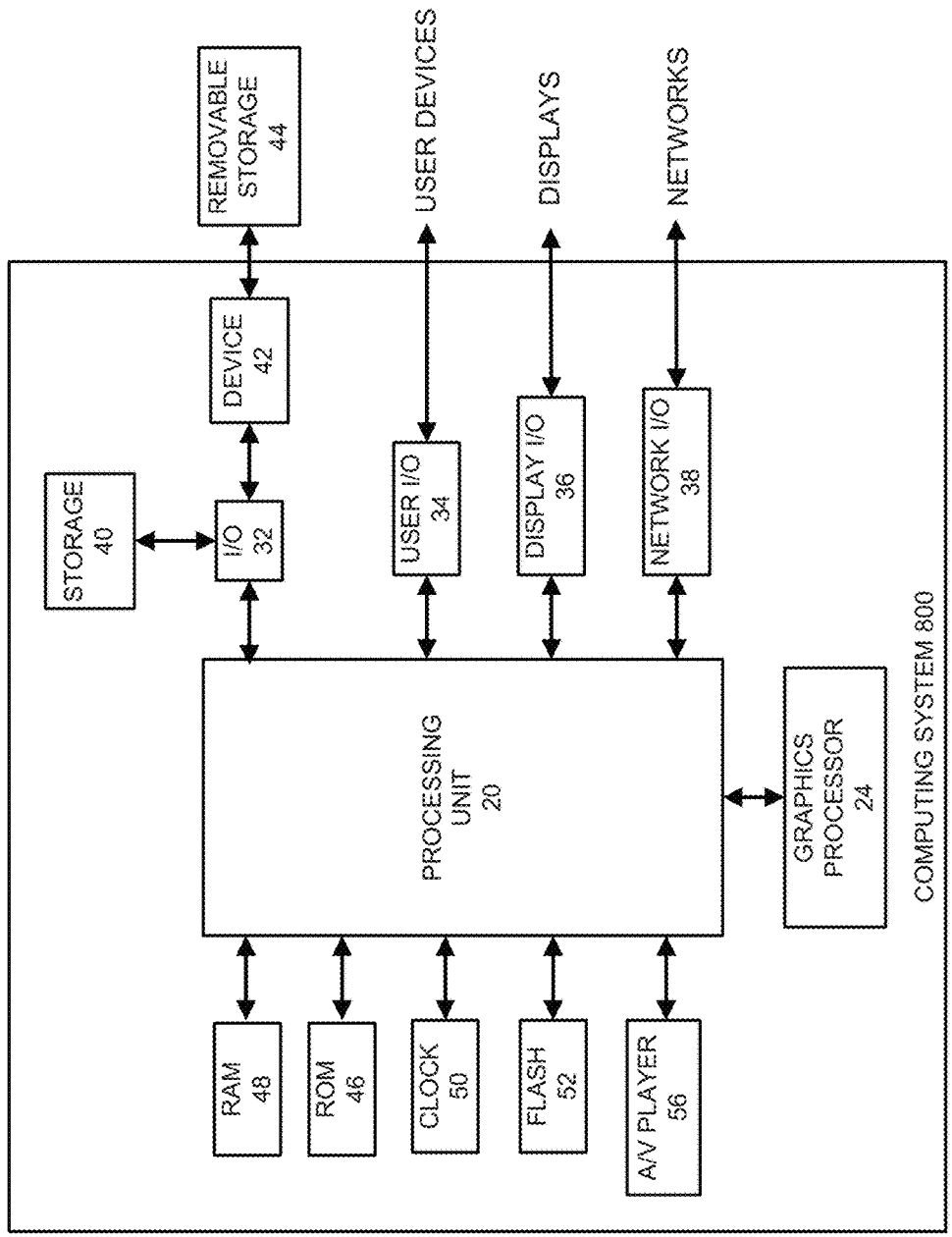
FIG. 8 illustrates an embodiment of a hardware configuration for a computing system.

FIG. 8 illustrates an embodiment of a hardware configuration for a computing system 800, such as the computing systems 102 or 130 shown in FIG. 1. Other variations of the computing system 800 may be substituted for the examples explicitly presented herein, such as removing or adding components to the computing system 800. The computing system 800 may include a computer, a server, a smart phone, a tablet, a personal computer, a desktop, a laptop, a smart television, and the like.

As shown, the computing system 800 includes a processing unit 20 that interacts with other components of the computing system 800 and also components external to the computing system 800. A game media reader 22 may be included that can communicate with game media 12. Game media reader 22 may be an optical disc reader capable of reading optical discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The computing system 800 may include a separate graphics processor 24. In some cases, the graphics processor 24 may be built into the processing unit 20, such as with an APU. In some such cases, the graphics processor 24 may share Random Access Memory (RAM) with the processing unit 20. Alternatively, or in addition, the computing system 800 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The computing system 800 also includes various components for enabling input/output, such as an I/O 32, a user I/O 34, a display I/O 36, and a network I/O 38. As previously described, the input/output components may, in some cases, include touch-enabled devices. The I/O 32 interacts with storage element 40 and, through a device 42, removable storage media 44 in order to provide storage for the computing system 800. The storage element 40 can store a database that includes the images, gameplay logs, and/or AI models. Processing unit 20 can communicate through I/O 32 to store data, such as game state data and any shared data files. In addition to storage 40 and removable storage media 44, the computing system 800 is also shown including ROM (Read-Only Memory) 46 and RAM 48. RAM 48 may be used for data that is accessed frequently, such as when a game is being played, or for all data that is accessed by the processing unit 20 and/or the graphics processor 24.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing system 800 on a display device, such as graphics, user interfaces, video, and/or other visual content. The computing system 800 may comprise one or more integrated displays configured to receive display output signals produced by the display I/O 36, which may be output for display to a user. According to some embodiments, display output signals produced by the display I/O 36 may also be output to one or more display devices external to the computing system 800.

The computing system 800 can also include other features that may be used with a game, such as a clock 50, flash memory 52, and other components. An audio/video player 56 might also be used to play a video sequence, such as a movie. It should be understood that other components may be provided in the computing system 800 and that a person skilled in the art will appreciate other variations of the computing system 800.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the computing system 800 is turned off or loses power.

As computing system 800 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves, increases, or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and the like, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A non-transitory, computer-readable storage medium storing computer readable instructions that, when executed by one or more computing devices, causes the one or more computing devices to perform operations comprising:
   generating an image indicating positional information about objects in a virtual environment within a video game, the objects including at least one computer-controlled character;
   generating data including non-positional information about the objects in the virtual environment;
   selecting a first artificial intelligence (AI) model from among a plurality of AI models based at least in part on the image and the data;
   providing the image and the data as inputs to the first AI model, wherein the first AI model is configured to:
      receive, as model inputs, the image and the data;
      process the model inputs; and
      generate, as outputs, at least one command to control operation of the computer-controlled character;
   executing the at least one command to control operation of the computer-controlled character within the virtual environment; and
   generating instructions to output the execution of the at least one command by the computer-controlled character within the virtual environment during runtime execution of the video game.

2. The non-transitory, computer-readable storage medium of claim 1, wherein generating the image includes generating a retina image focused on the computer-controlled character, the retina image divided into a plurality of cells each corresponding to a location in the virtual environment, wherein the cell includes an indicator of which objects from the virtual environment are positioned in the corresponding locations.

3. The non-transitory, computer-readable storage medium of claim 2, wherein boundaries of the plurality of cells are defined by concentric shapes and by slices of the concentric shapes.

4. The non-transitory, computer-readable storage medium of claim 1, wherein the image is a matrix image, each cell of the matrix image corresponding to a location in the virtual environment.

5. The non-transitory, computer-readable storage medium of claim 1, wherein:
   the image is a matrix image comprising a plurality of matrix elements;
   each matrix element corresponds to a location in the virtual environment;

a value, color, or visual indicator of the matrix elements indicate relational positions of objects in the corresponding locations; and the matrix image is separate from a video output frame of the video game.

6. The non-transitory, computer-readable storage medium of claim 5, wherein the matrix elements are mapped to the corresponding locations on a retina image that is focused on the computer-controlled character.

7. The non-transitory, computer-readable storage medium of claim 1, wherein processing the model inputs includes processing the image using convolutional neural network analysis.

8. The non-transitory, computer-readable storage medium of claim 1, wherein the operations further include:
checking, against hard coded software rules, consequences of causing computer-controlled character to execute the control operation; and
causing the computer-controlled character to behave in the video game according to the control operation based at least in part on the consequences.

9. The non-transitory, computer-readable storage medium of claim 1, wherein the computer-controlled character has a role similar to a role of a human-controllable character in the video game.

10. A computer-implemented method for controlling a computer-controlled character, the method comprising:
generating an image indicating positional information about objects in a virtual environment of a video game, the objects including at least the computer-controlled character and a player controlled character;
generating data including non-positional information about the objects in the virtual environment;
selecting a first artificial intelligence (AI) model from among a plurality of AI models based at least in part on the image and the data;
providing the image and the data as inputs to the first AI model, wherein the first AI model is configured to:
receive, as model inputs, the image and the data;
process the model inputs; and
generate, as outputs, at least one command for controlling operation of the computer-controlled character; and
executing the at least one command to control operation of the computer-controlled character within the virtual environment.

11. The computer-implemented method of claim 10, wherein generating the image includes generating a retina image focused on the computer-controlled character, the retina image divided into a plurality of cells each corresponding to a location in the virtual environment, wherein the cell includes an indicator of which objects in the virtual environment are positioned in the corresponding locations.

12. The computer-implemented method of claim 10, wherein generating the image further includes generating a matrix image, each cell of the matrix image corresponding to a location in the virtual environment and indicating objects of the virtual environment that are positioned in the corresponding locations.

13. The computer-implemented method of claim 12, wherein locations are defined by concentric shapes and by slices of the concentric shapes.

14. The computer-implemented method of claim 10, wherein the image is a matrix image comprising a plurality of matrix elements,
wherein each matrix element corresponds to a location in the virtual environment;
wherein a value, color, or visual indicator of the matrix elements indicate relational positions of objects in the corresponding locations; and
wherein the matrix image is separate from a video output frame of the video game.

15. The computer-implemented method of claim 10, wherein processing the model inputs includes processing the image using convolutional neural network analysis.

16. The computer-implemented method of claim 10, wherein the computer-controlled character has a role similar to a player-controllable character in the video game.

17. A system for controlling a non-player character (NPC), the system comprising:
a player input device;
a non-transitory computer-readable storage medium configured to store code for a video game and a plurality of artificial intelligence (AI) models;
one or more processors configured to execute the code to perform operations comprising:
generating an image indicating positional information about objects in a virtual environment of the video game, the objects including at least a computer-controlled character and a player controlled character;
generating data including non-positional information about the objects in the virtual environment;
selecting a first AI model from among the plurality of AI models based at least in part on the image and the data;
providing the image and the data as inputs to the first AI model, wherein the first AI model is configured to:
receive, as model inputs, the image and the data;
process the model inputs; and
generate, as outputs, at least one command for controlling the computer-controlled character;
executing the at least one command to control operation of the computer-controlled character within the virtual environment; and
executing a command received through the player input device to control a player-controlled character within the virtual environment.

18. The system of claim 17, wherein the operations further include:
checking, against hard coded software rules, consequences of causing computer-controlled character to execute the control operation; and
causing the computer-controlled character to behave in the video game according to the control operation based at least in part on the consequences.

19. The system of claim 17, wherein:
the operations further include:
receiving, through the player input device, a selection of an AI model preference; and
wherein selecting the first AI model from among a plurality of AI models is further based at least in part on the AI model preference.

* * * * *